US009755430B2

(12) United States Patent
Paquin et al.

(10) Patent No.: US 9,755,430 B2
(45) Date of Patent: Sep. 5, 2017

(54) VIRTUAL INVERTER FOR POWER GENERATION UNITS

(71) Applicant: SOLANTRO SEMICONDUCTOR CORP., Ottawa (CA)

(72) Inventors: Antoine Marc Joseph Richard Paquin, Navan (CA); Edward Patrick Keyes, Ottawa (CA); Raymond Kenneth Orr, Kanata (CA); Peter Giles Preston-Thomas, Richmond (CA); Olivier Anne Jean-Yves Chapel, Paris (FR)

(73) Assignee: SOLANTRO SEMICONDUCTOR CORP., Ottawa (CA)

( * ) Notice: Subject to any disclaimer, the term of this patent is extended or adjusted under 35 U.S.C. 154(b) by 927 days.

(21) Appl. No.: 13/861,047

(22) Filed: Apr. 11, 2013

(65) Prior Publication Data

US 2014/0306533 A1    Oct. 16, 2014

(51) Int. Cl.
*H02J 1/00* (2006.01)
*H02J 3/38* (2006.01)

(52) U.S. Cl.
CPC .............. *H02J 1/00* (2013.01); *H02J 3/383* (2013.01); *Y02E 10/563* (2013.01); *Y10T 307/50* (2015.04); *Y10T 307/549* (2015.04); *Y10T 307/707* (2015.04)

(58) Field of Classification Search
CPC ......... H02J 1/00; H02J 3/383; Y10T 307/707; Y10T 307/549; Y10T 307/50; Y02E 10/563
See application file for complete search history.

(56) References Cited

U.S. PATENT DOCUMENTS

| 7,531,741 | B1* | 5/2009 | Melton ............... F24J 2/045 136/246 |
| 8,406,019 | B2 | 3/2013 | Garces et al. |
| 2003/0182023 | A1 | 9/2003 | Perez |
| 2007/0085343 | A1 | 4/2007 | Fortmann |
| 2008/0265577 | A1 | 10/2008 | Fortmann et al. |
| 2009/0000654 | A1 | 1/2009 | Rotzoll et al. |

(Continued)

FOREIGN PATENT DOCUMENTS

| EP | 2 211 454 A1 | 7/2010 |
| EP | 2 295 892 A1 | 3/2011 |

(Continued)

OTHER PUBLICATIONS

Harashima et al., Microprocessor-Controlled SIT Inverter for Solar Energy SYstem, Feb. 1987, IEEE Transactions on Industrial Electronics, vol. IE-34, No. 1, pp. 50-55.*

*Primary Examiner* — Zeev V Kitov
(74) *Attorney, Agent, or Firm* — Pearne & Gordon LLP

(57) ABSTRACT

A gateway controller allows a plurality of individual power generation units coupled to an electrical distribution grid to be controlled in a coordinated fashion. The gateway controller allows control of the plurality of individual power generation units as a single power generation unit. The gateway controller may determine required control parameters of the power generation units that will provide a desired combined behavior, such as combined alternating current injected into the grid, and issues commands to the power generation units based on the determined control parameters.

37 Claims, 18 Drawing Sheets

(56) References Cited

U.S. PATENT DOCUMENTS

| | | |
|---|---|---|
| 2009/0085533 A1 | 4/2009 | Devine |
| 2010/0067271 A1* | 3/2010 | Garces .................. H02J 3/18 |
| | | 363/95 |
| 2010/0134959 A1* | 6/2010 | Fife .................. H05K 7/20945 |
| | | 361/678 |
| 2010/0188135 A1 | 7/2010 | Keronen et al. |
| 2012/0217807 A1 | 8/2012 | Galler et al. |
| 2012/0281444 A1* | 11/2012 | Dent .................. H02M 1/32 |
| | | 363/56.01 |
| 2013/0015710 A1 | 1/2013 | Rotzoll et al. |
| 2013/0056614 A1* | 3/2013 | Balachandreswaran .................. |
| | | G01J 1/0219 |
| | | 250/203.4 |
| 2013/0311811 A1* | 11/2013 | Bose .................. G06F 9/50 |
| | | 713/340 |

FOREIGN PATENT DOCUMENTS

| | | |
|---|---|---|
| WO | 2007/006565 A2 | 1/2007 |
| WO | 2008/144540 A1 | 11/2008 |

\* cited by examiner

VIRTUAL INVERTER FOR POWER GENERATION UNITS

TECHNICAL FIELD

The current application relates generally to the field of electrical grid power generation, and in particular to coordinated control of distributed power generation units.

BACKGROUND

Distributed generators are becoming increasingly common components of electrical grids. They typically use renewable power generating components such as photovoltaic (PV) solar panels or wind turbines but can also use non-renewable power sources such as natural gas. Distributed generators may be widely distributed across the electrical grid and connected to either the low or medium voltage portions of the electrical grid. These distributed generators inject synchronized current into the electrical grid.

A number of PV panels arranged in an array may be connected to the electrical grid through a central inverter. However, central inverters are associated with one or more drawbacks. One drawback of a central inverter is the lowering of the overall efficiency of the PV panel array as all PV panels in a string of panels must operate at the same current. An alternative to using a central inverter is to provide an inverter to each PV panel. This allows each panel to operate at its maximum power point regardless of the performance of other PV panels in the array.

Inverters for individual PV panels may have their functionality distributed across multiple components. For example, inverter components for converting the Direct Current (DC) output of the PV panel to Alternating Current (AC) suitable for injecting into the electrical grid may be physically located at the PV panel. A gateway component may include additional functionality for monitoring and controlling the inverters and may be located remotely from the panel. The partitioning of the inverter functionality in this manner allows for common functionality of the inverters to be collected at a single point in the gateway, thereby possibly reducing the complexity of the individual inverter components located at the panels. Further, the partitioning of the inverter functionality may allow simplified upgrading of certain functionality located in the gateway throughout the life of the PV panels. While partitioning the functionality of the inverters may provide benefits, the inverters still function as individual inverters, increasing the complexity of controlling the PV panels.

Inverters, and in particular inverters for PV panels, may not include grid stability functionality more common for inverters connected to larger power sources. The grid stability functionality may include, for example, fault ride through, demand response, reduction of active power with over voltage/frequency or injection of reactive power. When the individual inverters of PV panels detect grid instability, that is the operating parameters of the grid falls outside of particular thresholds, the inverters may simply disconnect from the grid. Such an approach is suitable if the inverters are supplying a small amount of power to the grid; however, as distributed generation becomes more common, the amount of power supplied to the grid increases. In such cases, an inverter disconnecting from the grid individually may not pose a problem; however, if all the inverters disconnect at the same time the resultant decrease in power supplied to the grid may lead to further grid instability.

Although there are advantages with the use of distributed power generation in an electrical grid, as the amount of power provided by these distributed generators increases, the need for more advanced control of the individual power generators arises.

BRIEF DESCRIPTION OF THE DRAWINGS

Various embodiments of an inverter for an individual PV panel will be described with reference to the drawings, in which.

DETAILED DESCRIPTION

Figure 1:
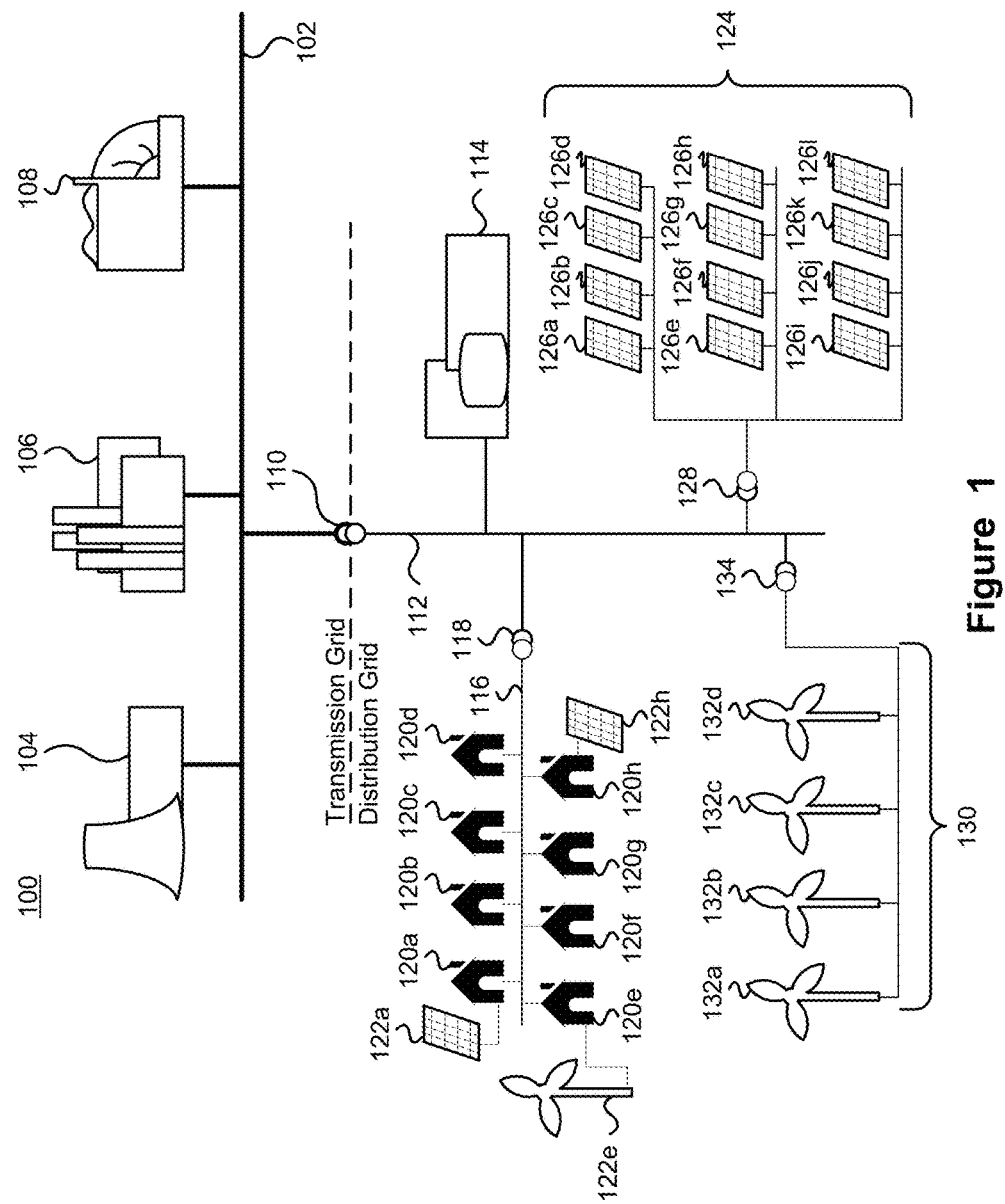
FIG. 1 depicts an electrical grid in which the current power generation and control may be used.

An embodiment described herein provides a photovoltaic (PV) power generation and control system comprising a coordinated power generation group comprising a plurality of generation units capable of outputting alternating current (AC), each generation unit comprising a PV panel capable of producing direct current (DC); and an inverter capable of outputting AC from the DC produced by the PV panel, the inverter including a communication interface for receiving remote control information for setting at least one control parameter to control an output characteristic of the inverter. The power generation and control system further comprises a gateway controller comprising a communication interface for communicating with the respective inverters of the plurality of generation units; and control functionality for determining remote control information for setting respective control parameters of the inverters of the plurality of generation units to cooperatively control the output characteristics of the inverters of the plurality of power generation units to provide a desired combined behavior from the plurality of power generation units.

In a further embodiment of the power generation and control system, the control functionality of the gateway controller comprises islanding functionality for controlling the output of the inverters to cooperatively detect islanding of the coordinated power generation group.

In a further embodiment of the power generation and control system, the islanding functionality sets control parameters of the inverters to cease injecting power into the electrical grid when islanding is detected.

In a further embodiment of the power generation and control system, the control functionality further comprises islanding recovery functionality for detecting that the coordinated power generation group is no longer in a power island and for resuming power injection into the electrical grid.

In a further embodiment of the power generation and control system, the control functionality of the gateway controller comprises output power control functionality for adjusting the output of respective inverters to provide a desired combined output from the coordinated power generation group.

In a further embodiment of the power generation and control system, the output power control functionality determines the output of the respective inverters to extend an expected lifetime of at least one of the plurality of inverters.

In a further embodiment of the power generation and control system, the output power control functionality determines the output of the respective inverters using one or more of naïve power reduction, degradation leveling, hours of operation, cumulative power production, partial power reduction, uniform power reduction, power leveling, power maintenance, temperature leveling, or temperature maintenance.

In a further embodiment of the power generation and control system, the control functionality of the gateway controller comprises grid stability and safety control functionality.

In a further embodiment of the power generation and control system, the grid stability and safety control functionality comprises one or more of over voltage/over frequency functionality, disconnect functionality, spinning reserve functionality, reactive power functionality, reactive power leveling functionality, reactive power optimization functionality, and fault ride through functionality.

In a further embodiment of the power generation and control system, the coordinated power generation group further comprises a connection point for coupling the inverters of the plurality of power generation units to an electrical grid, the connection point comprises a monitoring component for monitoring one or more characteristics of the AC injected into the electrical grid.

In a further embodiment of the power generation and control system, the monitoring component of the connection point further monitors one or more characteristics of the AC of the electrical grid.

In a further embodiment of the power generation and control system further comprises a plurality of coordinated power generation groups, each having a respective connection point.

In a further embodiment of the power generation and control system, the inverter further comprises a temperature sensor for measuring a temperature of the inverter, and wherein the controller of the inverter further comprises functionality capable of monitoring the temperature measured by the temperature sensor and communicating the monitored temperature to the gateway controller.

In a further embodiment of the power generation and control system, the inverter further comprises a voltmeter for measuring a voltage of the AC output from the inverter, and the controller of the inverter further comprises functionality capable of monitoring the voltage of the AC output measured by the voltmeter and communicating the monitored voltage to the gateway controller.

In a further embodiment of the power generation and control system, the inverter further comprises an ammeter for measuring a current of the AC output from the inverter, and the controller of the inverter further comprises functionality capable of monitoring the current of the AC output measured by the ammeter and communicating the monitored current to the gateway controller.

Another embodiment described herein provides a gateway controller for controlling a plurality of power generation units each outputting alternating current (AC) to an electrical distribution grid, the gateway controller comprising a communication interface for communicating with the plurality of power generation units; and at least one processor and associated memory storing instructions for execution by the at least one processor, when executed by the processor. The instructions configuring the gateway controller to determine a desired combined behavior from the plurality of power generation units; determine control parameters of individual power generation units required to provide the desired combined behavior; and issue commands, using the communication interface, to the individual power generation units to control the determined control parameters of the individual power generation units to provide the desired combined behavior from the plurality of power generation units.

In a further embodiment of the gateway controller, the instructions, when executed by the processor, further configure the gateway controller to control the output of the power generation units to cooperatively detect islanding of the plurality of power generation units.

In a further embodiment of the gateway controller, the instructions, when executed by the processor, further configure the gateway controller to issue commands to the individual power generation units to cease injecting power into the electrical grid when islanding is detected.

In a further embodiment of the gateway controller, the instructions, when executed by the processor, further configure the gateway controller to determine that the plurality of power generation units are no longer in a power island; and issue commands to the power generation units to resume power injection into the electrical distribution grid.

In a further embodiment of the gateway controller, wherein the desired combined behavior is providing a desired combined output power to the electrical distribution grid, and the issued commands comprise commands for adjusting output of respective power generation units to provide the desired combined output from the plurality of power generation units.

In a further embodiment of the gateway controller, the output power of the respective power generation units are adjusted to extend an expected lifetime of at least one of the plurality of power generation units.

In a further embodiment of the gateway controller, the output of the individual power generation units required to provide the desired combined output is determined using one or more of naïve power reduction, degradation leveling, hours of operation, cumulative power production, partial power reduction, uniform power reduction, power leveling, power maintenance, temperature leveling, or temperature maintenance.

In a further embodiment of the gateway controller, the desired combined behavior provides grid stability and safety control functionality.

In a further embodiment of the gateway controller, the grid stability and safety control functionality comprises one or more of over voltage/over frequency functionality, disconnect functionality, spinning reserve functionality, reactive power functionality, reactive power leveling functionality, reactive power optimization functionality, and fault ride through functionality.

A still further embodiment described herein provides a method controlling a plurality of power generation units, each outputting alternating current (AC) to an electrical distribution grid. The method comprises determining at a gateway controller a desired combined behavior from the plurality of power generation units; determining control parameters of individual power generation units required to provide the desired combined behavior; and issuing commands, using a communication interface of the gateway controller, to the individual power generation units based on the determined control parameters of the individual inverters to provide the desired combined behavior from the plurality of power generation units.

A power generation and control system, as well as associated methods and components are described further herein. The power generation and control system may control a distributed collection of inverters in a coordinated fashion, allowing control of the plurality of inverters as a single virtual inverter. The virtual inverter allows regulation and control of a large distributed array of power generation units as if they were a single power generation unit. In addition to providing a single point of coordinated control of the plurality of distributed inverters, the virtual inverter may allow the distributed collection of inverters to provide sophisticated grid stability functions that may not have been possible from the individual inverters.

In addition to potentially improving stability of the electrical grid, the virtual inverter of the power generation and control system may allow the optimization of the lifetime of the individual power generation units. Further, the virtualization of a plurality of inverters into a single virtual inverter may simplify setup, control, maintenance or other functionality of the power generation system.

As described further herein, a coordinated power generation group may be controllable in a similar fashion as a single power generation unit and as such, coordinated power generation groups may be further controlled by a hierarchy of virtual inverters. Accordingly, a large number of individual power generation units may be controlled from a single point in order to provide a desired combined behavior from the plurality of power generation units.

FIG. 1 depicts an electrical grid in which the current power generation and control may be used. It will be appreciated that the depiction of the electrical grid of FIG. 1 has been simplified to highlight concepts of the electrical grid. Broadly, the electrical grid 100 comprises a transmission grid 102 and a distribution grid 112. The transmission grid 102 provides for transmission of power from points of generation to points of consumption. The transmission grid 102 typically connects large-scale power generation plants, such as nuclear power plants 104, coal power plants 106 and hydroelectric plants 108, with distribution grids over a large geographical area. The transmission grid 102 operates at high or extra high voltages, which may be in the approximate range of, for example, 60 kV to 300 kV or above.

The high-voltage transmission grid 102 may be connected to a number of lower voltage distribution grids, such as distribution grid 112. The transmission grid 102 and the distribution grid 112 may be coupled together at a power substation where the high voltage of the transmission grid 102 is stepped down to the lower voltage of the distribution grid 112. The distribution grid 112 may operate at medium voltages in the range of between 1 kV and 60 kV as well as low voltages less than 1 kV. The distribution network connects the transmission grid 102 to power consumers as well as other smaller-scale power generation components. The medium and low voltage portions of the distribution grid may be coupled together at substations, depicted diagrammatically in FIG. 1 as connections 118, 128, 134.

Large commercial consumers, such as manufacturing factories may be coupled to the medium voltage portion of the distribution network, while smaller consumers such as individual homes 120$a$-$h$ may be connected to a low voltage portion 116 of the distribution grid.

In addition to the power consumers connected to the electrical grid, distributed power generation units may also be connected to the power grid. These distributed power generation units typically do not produce as large amounts of power as the large-scale power plants 104, 106, 108 and as such may be coupled to the distribution grid 112. The distributed power generation units may include, for example photovoltaic (PV) panels 122$a$, 122$h$ or wind generators 122$e$ of homeowners. In addition to the power generation units of homeowners, power generation arrays, such as solar farms 124 or wind farms 130, may be coupled to the distribution grid 112. The generation arrays 124, 130 operate in a similar fashion as the power generators 122$a$, 122$h$, 122$e$; however, there is typically a larger number of individual power generation units coupled together. As depicted, the power generation units may be PV panels 126$a$-$l$ or wind generations 132$a$-$d$. It will be appreciated that other power generation or supply components may be coupled to the distribution grid 112.

It will be appreciated that the electrical grid 100, described above with reference to FIG. 1, is intended only to be a broad explanation of a general power grid. For example, specific topologies of grid networks, operating voltages, frequencies etc. have not been described in detail. However, the above description provides sufficient description of electrical grids for one of ordinary skill in the art to implement a power generation and control system as described further herein.

Turning to the low voltage portion 116 of the distribution grid 112 in FIG. 1, if there is only a single distributed power generation unit, such as PV panel 122$a$, connected to the low voltage portion 116, it will not have a significant impact on the operation of the grid. Accordingly, it is possible to disconnect and reconnect the power generation unit as desired without concern for the stability of the grid. Inverters of such power generation units may monitor one or more characteristics, such as voltage or frequency, of the grid, and if the characteristics fall outside of a threshold, the inverter may simply disconnect from the grid.

As more distributed power generation units are connected to the same low voltage portion of the grid, operating all of the inverters in a similar manner of disconnecting if grid characteristics fall outside of a range, may lead to further grid instability due to the removal of a possibly significant amount of power supplied to the grid by the distributed power generation units. As described further below, a gateway controller in accordance with the present may be used to virtualize a number of individual power generation units into a single power generation unit in order to control the individual power generation units in a coordinated fashion to act as a single power generation unit that produces a larger amount of power than an individual power generation unit.

Figure 2:
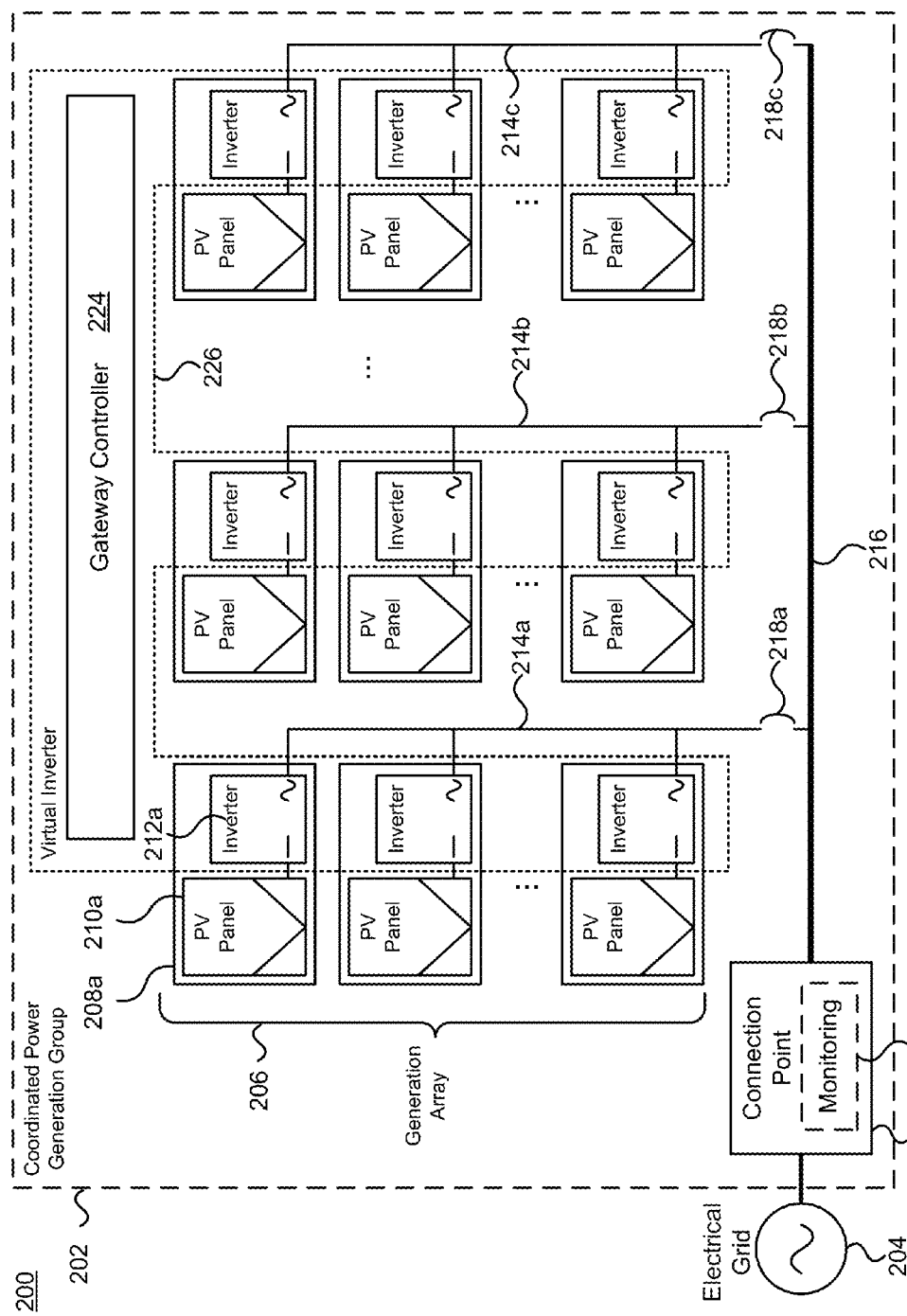
FIG. 2 depicts a power generation and control system.

FIG. 2 depicts a power generation and control system. The power generation and control system 200 comprises a coordinated power generation group 202 that provides power conversion and other functions for a plurality of power generation units 206 connected to an electrical grid 204. The plurality of power generation units are depicted as being arranged in a generation array 206, however, other topologies are possible. The generation array 206 comprises a number of individual power generation units 208a, 208n, referred to collectively as power generation units 208. It is noted that not all of the power generation units are labeled for clarity of the Figure. Each of the power generation units 208 is depicted as comprising a respective PV panel 210a, 210n (referred to collectively as PV panels 210) with associated inverters 212a, 212n (referred to collectively as inverters 212). Although depicted as comprising a PV panel, it will be appreciated that individual power generation units 208 may employ other power generation techniques such as wind turbines, fuel cells or batteries. Although batteries may be considered as power storage as opposed to power generation units, it will be appreciated that they may be capable of outputting power in a similar fashion as PV panels, and as such can considered herein as power generators. As depicted, each of the inverters 212 provides alternating current (AC) output. Subsets of power generation units may be grouped together and connected in parallel to local AC buses 214a, 214b, 214n (referred to collectively as local AC buses 214).

The individual inverters 212 of the power generation units may have one or more control parameters that can be adjusted in order to control the output of the inverter. For example, the inverter may adjust a voltage the PV panel operates at in order to adjust the AC output, or the inverter may disconnect completely from the local AC bus to cease injection of current. The control parameters of individual inverters 212 may be adjusted independently from the control parameters of other individual inverters 212. For example, if the power generation units 208 comprise PV panels 210 as depicted, the inverter may adjust an operating voltage or current of the PV panel in order to adjust the power produced by the panel, and so the current output from the inverter.

The local AC buses 214 may be connected to a main AC bus 216 through local circuit breakers 218a, 218b, 218n. Local AC buses 216 may be single phase busses or multi-phase such as for example, three phase. Main AC bus 216 connects to the electrical power grid 204 through a connection point 220. In some embodiments, such as a residential application with a limited number of individual power generation units, the connection point 220 may comprise a switch. In other embodiments, the connection point 220 may further include a transformer to convert the voltage of the main AC bus 216 to the voltage of the electrical grid 204. The connection point 220 may couple the main AC bus to a low voltage, medium voltage, or high voltage portion of the electrical grid depending on the combined generating capacity of the generation array 206.

As depicted in FIG. 2, the connection point 220 may also include monitoring functionality 222 to measure the one or more characteristics of the power injected into the grid 204 from the main AC bus 216. For example the monitoring functionality 222 may monitor the current, voltage, frequency and/or phase angle of the power supplied from the main AC bus 216. In addition to monitoring one or more characteristics of the power supplied from the main AC bus 216, the monitoring functionality 222 may further monitor one or more characteristics of the electrical grid 204. For example the monitoring functionality 222 may monitor the voltage and/or of the electrical grid frequency. The monitoring functionality 222 may also measure or determine the phase difference between the grid voltage and the injected current. Although depicted in the Figures, the monitoring functionality 222 may be absent. If the monitoring functionality 222 is present, as depicted, the connection point 220 may communicate the monitored information, or portions of the monitored information, to one or more locations, such as a gateway controller 224 described further below.

Gateway controller 224 communicates through communication links (not depicted for simplicity) with individual inverters 212 of the power generation units 208. The communication link may be from the gateway controller 224 to the individual inverters 212, or may be bi-directional. The communication link between the gateway controller and the inverters 212 may be provided by a number of different wired or wireless communication techniques, including for example, Wi-Fi, WiMax, ZigBee, cellular, powerline, Ethernet or optical. Further, the communication may be provided a mesh network topology or other network topology. The communication between the gateway controller 224 and the inverters 212 may incorporate one or more possible communication techniques. Additionally, the gateway controller 224 may also communicate with the connection point 220. The communication link between the connection point 220 and the gateway controller 224 may also be either in a single direction, or bi-directional. However, if the communication link is in a single direction, it should be from the connection point 220 to the gateway controller 224 so that the gateway controller 224 can receive monitoring information from the connection point 220.

The gateway controller 224 communicates with the individual inverters 212 in order to coordinate their operation. By coordinating the control of the individual inverters, the gateway controller 224 and individual inverters 212 function as a single virtual inverter 226.

The gateway controller 224 may issue a variety of remote control commands to individual inverters 212 over the communication links. The individual inverters may receive and process the remote control commands to control an output characteristic of the respective inverter. The remote control commands may include, for example, commands to disconnect from local busses 214, reconnect to local busses 214, stop or start injecting power into the local busses 214, vary their output power, vary their output current phase angle. Additionally, the commands may include request commands to the inverters to provide information. These request commands may include, for example: report the inverter's internal temperature, report the local bus voltage, report the local bus frequency or report other bus parameters, report the inverter's output power, report the inverter's output current, report the inverter's output voltage, report the inverter's output frequency, report the inverter's output phase angle or report the inverter's excess generation capacity. In addition to providing monitoring information to the gateway controller 224 in response to a specific request command, the inverters 212 may provide one or more of the operating characteristics or output characteristics periodically, or when one or more of the operating or output characteristics changes from a current value, or crosses a threshold value. The operating characteristics of inverters 212 may include, for example, the presence of the inverter; nominal output power, voltage or current; phase type, which may be single phase or multi-phase; or the inverter's current operational state, which may be for example functional or non-functional; manufacturer's information such as serial number and/or date of manufacture; or an amount of time the inverter has been operational for.

The gateway controller 224 receives information from the individual inverters 212 and/or the connection point 222 and may issue commands to one or more individual inverters to cooperatively control the plurality of inverters to provide a desired combined behavior from the plurality of individual inverters. For example, if the electrical grid is producing more power than is currently being consumed, the total current injected into the grid from the coordinated power generation group can be reduced accordingly. The desired output current can be set at the gateway controller 224, which determines the output of individual inverters required to supply the desired output current. The gateway controller 224 may issue commands to one or more of the individual inverters 212 in order to adjust the power output from the inverters, and so lower the combined output power.

The coordinated power generation group 202, which comprises the virtual inverter provided by the gateway controller 224 and individual inverters 212, the power sources, which as depicted are the PV panels 210, as well as the connection point 220 to the electrical grid 204 can be controlled from a single point, namely the gateway controller 224. As such, the gateway controller 224 can be provided with a desired behavior from the combined power generation units. The desired behavior may specify a desired output characteristic, such as an amount of current injected to the grid, the phase or frequency of the injected current, or may specify other behaviors such as disconnecting from, or connecting to, the grid. Once the desired combined behavior is known, the gateway controller 224 may determine settings of control parameters of individual inverters that will supply the desired output characteristic to the electrical grid and send appropriate commands to the inverters for adjusting their outputs.

Although not depicted in FIG. 2, the gateway controller 224 may also communicate over a communication link (not shown) with an electrical grid control authority (not shown) for the purposes of coordinating the power generation of the array 206 of power generation units 208 with the electrical grid 204. Information communicated between the grid control authority and the gateway controller 224 may include, for example: instructions from the grid authority to start or stop injecting power into the grid, vary the total output power of the power generator array, identification of the location of faults on the grid, instructions to disconnect or reconnect to the grid, amount of spare generating capacity in the generation array, current total power output, main AC bus voltage and frequency.

Figure 3:
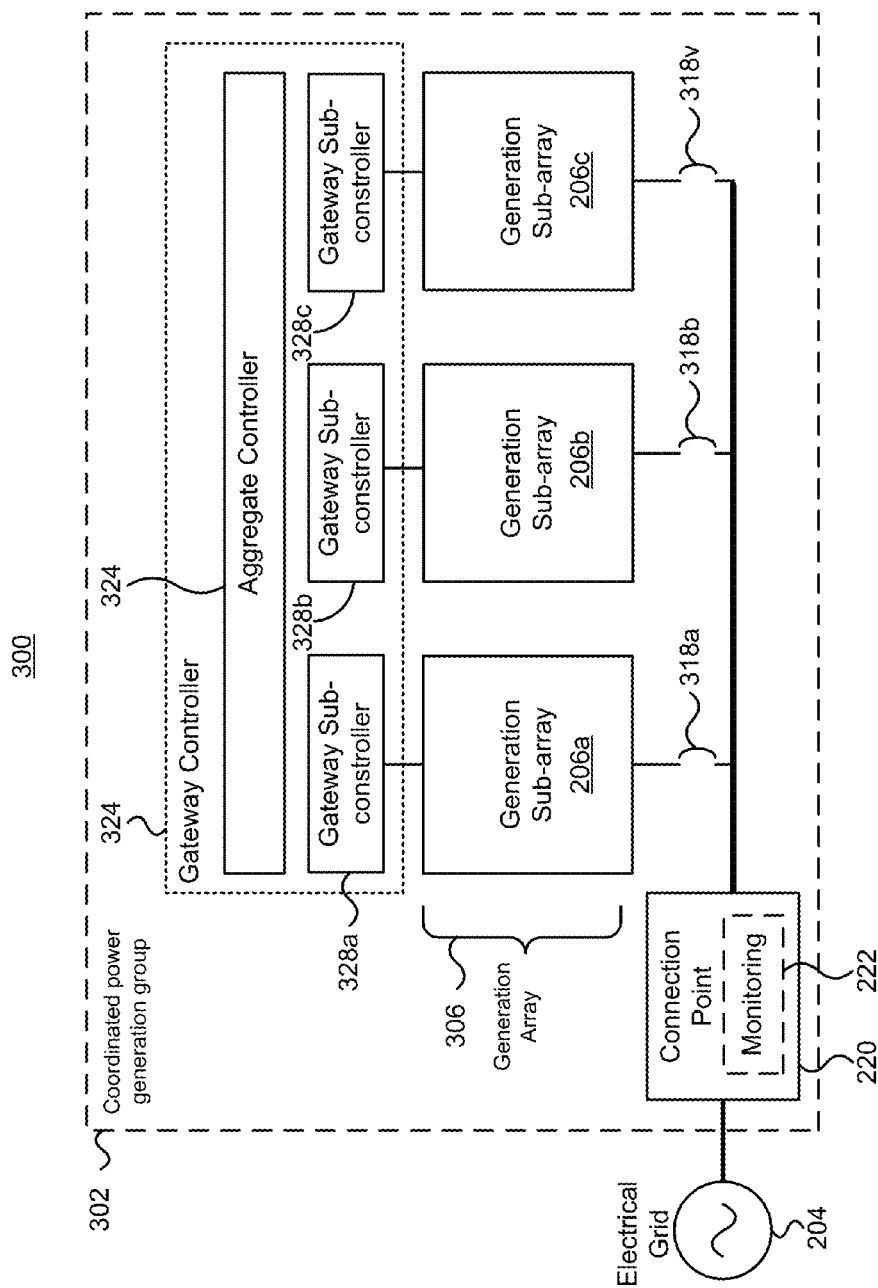
FIG. 3 depicts a further embodiment of a power generation and control system.

FIG. 3 depicts a further embodiment of a power generation and control system. The power generation and control system 300 is similar to the power generation and control system 200. However, the power generation and control system 300 is considered to have a larger number of individual power generation units, which are not depicted in FIG. 3, than the power generation and control system 200. The individual power generation units are grouped together into a plurality of generation sub-arrays 206a, 206b, 206n (referred to collectively as power generation sub-arrays 206) which collectively provide the generation array 306. The power generation system 300 comprises a coordinated power generation group 302 that can supply power to the electrical grid 204 from the generation array 306 through a connection point 220.

The large number of individual power generation units may be grouped together into groups of generation sub-arrays 206a, 206b, 206n, each of which may comprise a number of individual power generation units. Each of the generation sub-arrays 206a, 206b, 206n is similar to the generation array 206 as described with regard to FIG. 2. Each generation sub-array 206a, 206b, 206n may be connected to a main AC bus through a local breaker 318a, 318b, 318n. The gateway controller 324, which may provide the same or similar functionality as the gateway controller 224 described above, may be composed of a number of individual gateway sub-controllers 328a, 328b, 328n and an aggregate controller 330.

Each gateway sub-controller 328a, 328b, 328n communicates with the inverters of an associated generation sub-array 206a, 206b. 206n. For example, gateway sub-controller 328a communicates with the individual inverters of generation sub-array 206a, gateway sub-controller 328b communicates with generation sub-array 328b, etc. The functionality of the gateway controller 224 described above is divided between an aggregate gateway controller 330 and the gateway sub-controllers 328a, 328b, 328n. The division of the gateway control functionality as depicted in FIG. 3 may be beneficial for implementations involving large numbers of panels and inverters in which a single gateway controller, as described above with reference to FIG. 2, would be overwhelmed by the communication and/or control load. For example, the aggregate controller 330 might instruct each of the gateway sub-controllers 228a, 228b, 228n to reduce output power from the associated generation sub-array by a specific amount. The gateway sub-controllers 228a, 228b, 228n may in turn instruct specific inverters in the associate generation sub-arrays to reduce their power to meet this power reduction request. The individual generation sub-arrays 206a, 206b, 206n may be connected to the connection point 220, which may include monitoring 222 functionality as depicted, through respective breakers 318a, 318b, 318n.

Although only a single aggregation level in the gateway control 324 hierarchy is depicted in FIG. 3, it is contemplated that multiple levels of a gateway controller hierarchy are possible depending on the scale of the array.

Figure 4:
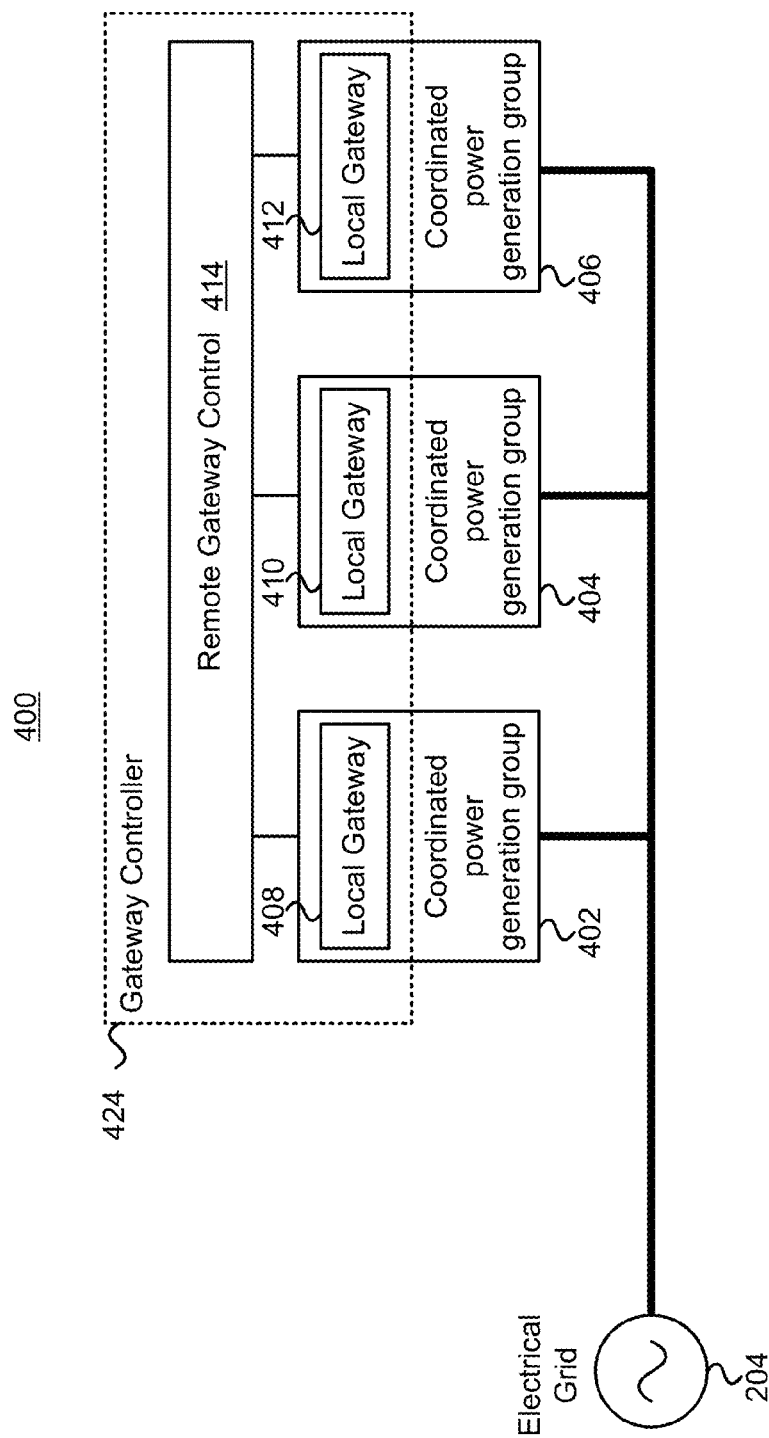
FIG. 4 depicts control of a plurality of coordinated power generation groups in a power generation and control system.

FIG. 4 depicts control of a plurality of coordinated power generation groups in a power generation and control system. As described above with regard to FIGS. 2 and 3, a plurality of individual power generation units can be controlled in a coordinated fashion by a gateway controller in order to connect the plurality of generation components to the electrical grid as a single coordinated power generation group. As described further below with regard to FIG. 4, a number of coordinated power generation groups may be controlled in a coordinated manner.

The power generation and control system 400 comprises a number of coordinated power generation groups 402, 404, 406 that are connected to the electrical grid. Each of the coordinated power generation groups 402, 404, 406 may be provided by a coordinated power generation group in accordance with the coordinated power generation groups 202 or 302 described above. Each coordinated power generation group 402, 404, 406 will have a number of power generation units that are coupled to the electrical grid by respective connection points as described above with regard to FIGS. 2 and 3. Each of the coordinated power generation groups 402, 404, 406 comprises a gateway controller, which is referred to as a local gateway 408, 410, 412. Each of the local gateways 408, 410, 412 may be provided by a gateway controller 202 or 302 as described above. In addition to the local gateways 408, 410, 412, the gateway controller 424 further comprises remote gateway control functionality 414 for controlling the local gateways 408, 410, 412 of the coordinated power generation groups 402, 404, 406 in a coordinated fashion.

The gateway controller 424 allows control of a number of generation arrays that are connected to the electrical grid by different connection points. For example, each coordinated power generation group 402, 404, 406 may comprise PV panels and associated inverters on different homes in a neighborhood, city or town. Each of the homes connects to the grid by a respective connection point. Each home has a local gateway capable of controlling the plurality of power generation units of the home. Each of the local gateways, in turn, may be controlled by a common remote gateway control in order to operate all of the power generation units in a coordinated fashion.

Figure 5:
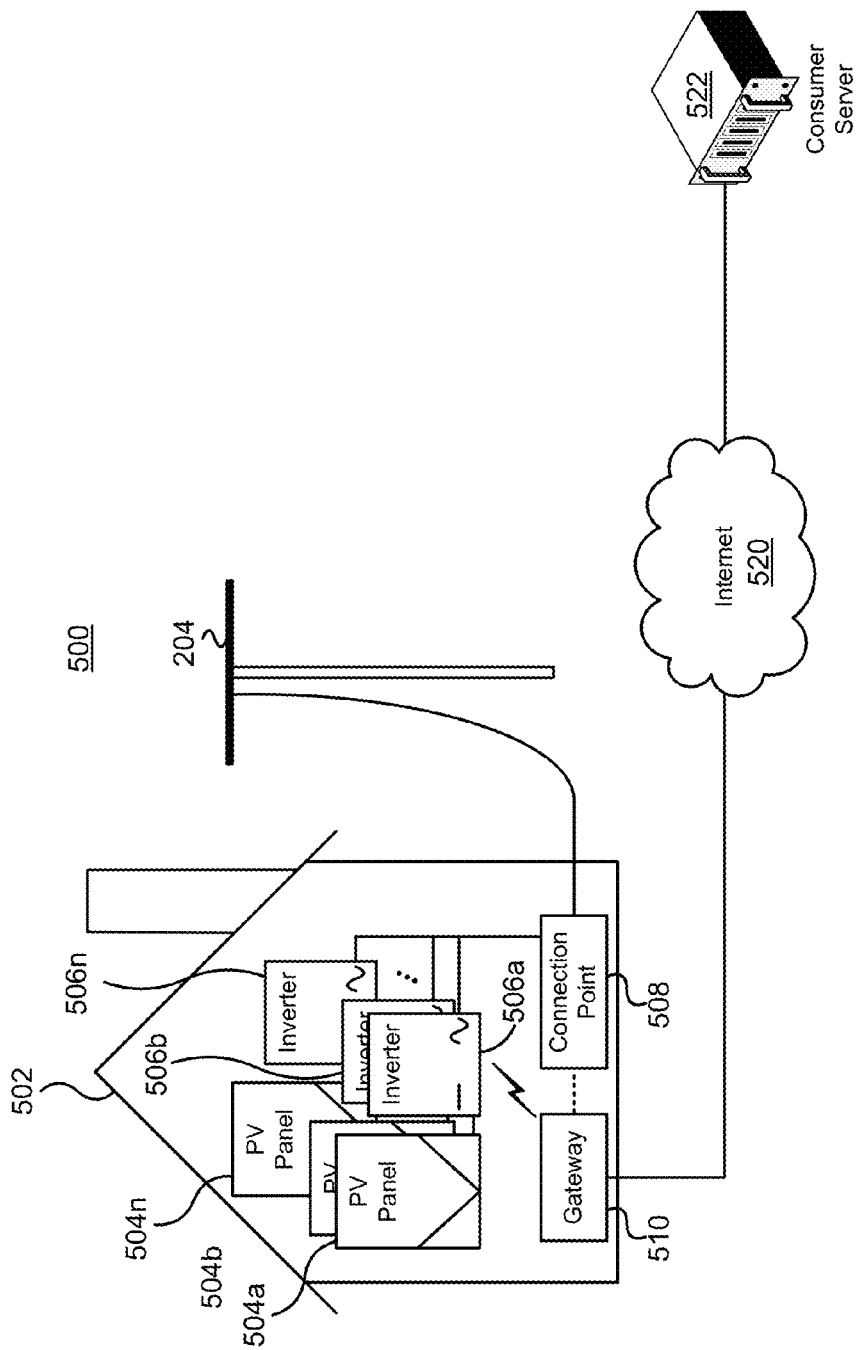
FIG. 5 depicts an illustrative embodiment of a power generation and control system.

FIG. 5 depicts an illustrative embodiment of a power generation and control system. The power generation and control system 500 comprises a home 502, which has a number of PV panels 504*a*, 504*b*, 504*n* (referred to collectively as PV panels 504) installed. Each of the PV panels 504 has an associated inverter 506*a*, 506*b*, 506*n* (referred to collectively as inverters 506). As described above, the inverters convert the DC output from the PV panels 504 to AC that can be injected into the electrical grid 204. The AC output of the inverters 506 is connected to a connection point 508 that is connected to the electrical grid 204. As will be appreciated, any power generated by the PV panels in excess of that used by the home may be injected back into the grid. Although not required, often electrical authorities will provide a feed-in tariff to home owners to provide compensation for injecting current into the grid. Although not depicted in FIG. 5, the connection point may include monitoring functionality as described above. The monitoring functionality may monitor characteristics of the current injected into the electrical grid 204 as well as characteristics of the electrical grid.

A gateway controller 510 may communicate with the inverters 506, as well as possibly the connection point 508. The gateway controller 510 issues commands to the inverters 506 in order to control the output of the individual inverters so that the combined output of the inverters 506 injected into the electrical grid provides a desired combined characteristic. The gateway controller 510 allows the plurality of individual inverters 506 to be controlled and operated as a single larger inverter.

The gateway controller 510 may be connected to the internet 520 and communicate with a consumer server 522. The consumer server 522 may provide a user interface, such as a web portal, to the home owner. The consumer server 522 may provide a user-friendly interface for interacting with the gateway control 510. Further the consumer server 522 may display monitored information to the home owner. The monitored information may include operating characteristics of individual PV panels 504 and inverters 506, characteristics of the combined output of the inverters, characteristics of the current injected into the grid, as well as characteristics of the grid. The consumer server 522 may also display additional information that may be useful to the consumer such as accumulated totals of power injected into the grid, the tariffs associated with the injected power, the weather, or other information that may be considered relevant or useful to the home owner.

As described above, the gateway controller 510 allows control of the plurality of the individual inverters and PV panels as if they were a single larger power generation unit.

Figure 6:
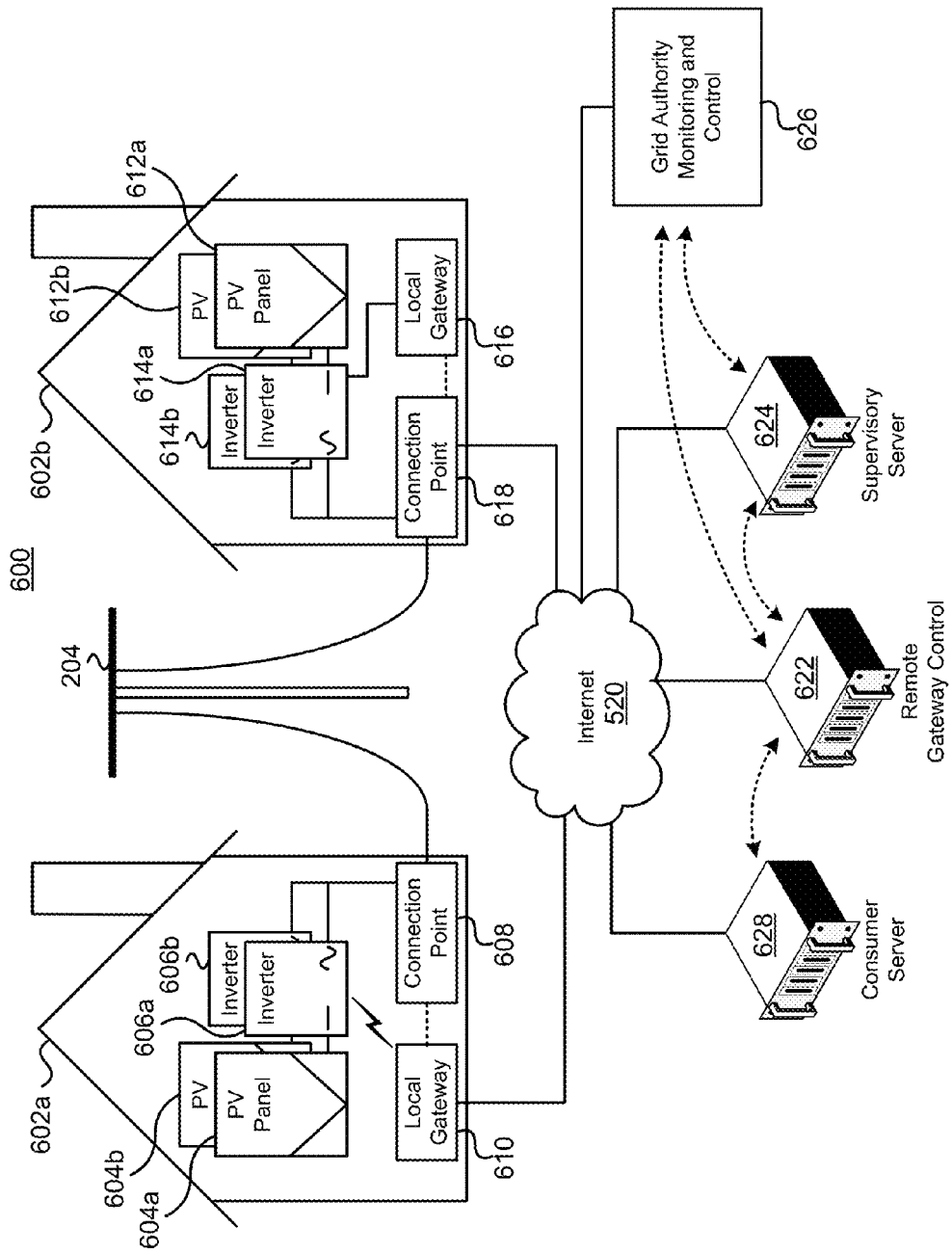
FIG. 6 depicts a further illustrative embodiment of a power generation and control system.

FIG. 6 depicts a further illustrative embodiment of a power generation and control system. The power generation and control system 600 is similar to the power generation and control system 500 described above; however, the power generation and control system 600 comprises two homes 602*a*, 602*b* each of which have respective PV panels 604*a*, 604*b*, 612*a*, 612*b* and associated inverters 606*a*, 606*b*, 614*a*, 614*b*. The inverters 606*a*, 606*b*, 614*a*, 614*b* of each home 602*a*, 602*b* are connected to the electrical grid 204 by respective connection points 608, 618. The connection points 608, 618 may comprise a switch for connecting the inverters to the grid 204, or may include additional monitoring functionality as described above. If the connection points 608, 618 include monitoring functionality, they may communicate the monitoring information to a respective local gateway 610, 616 of the homes 602*a*, 602*b*.

The local gateways 610, 616 are in communication with each of the respective inverters. The local gateway 610 is depicted as having a wireless communication link to the inverters 604*a*, 604*b*, while the local gateway 616 is depicted as having a wired communication link to the inverters 614*a*, 614*b*. The local gateways 610 further comprise a communication link, depicted as being provided over the internet 520, to a remote gateway control server 622. The remote gateway control server 622 can send and receive information to the local gateways including commands in order to control output characteristics of the individual inverters in order to provide a desired combined behavior from the plurality of PV panels. The remote gateway control server 622 may be in communication with a supervisory server 624 that may provide functionality for an operator to control the remote gateway control server and local gateways, and ultimately the individual inverters. The supervisory server 624 may provide a graphical user interface for simplifying the control of the remote gateway server. Grid authority monitoring and control functionality 626 allows the monitoring and control of the overall grid 204, or portions thereof. The remote gateway control server may also communicate with a consumer server 628 that may provide a portal to allow consumers, such as owners of homes 602*a*, 602*b* to view operating characteristics of their PV panels and inverters as well as potentially setting control options.

As an example, a grid authority operator may determine that the load on the grid has increased, and as such the power supplied by the homes to the grid may be increased, if possible, in order to meet the increased demand. The grid authority may issue a command, through the supervisory portal, to the remote gate control server to increase the power output. The grid authority does not need any knowledge of how the power is supplied or that there are multiple power generation units supplying the power, and as such the grid authority does not need to communicate commands directly to individual inverters. The remote gateway control server 622 receives the command from the grid authority and can determine if the power generation units of the homes can supply additional power. If they can supply additional power, the remote gateway control server may issue appropriate commands to the local gateway to increase the power in order to meet the increased demand. Control parameters may be adjusted as required in order to meet the desired output characteristic, and so increase the output power.

Although only two homes are depicted in FIG. 6, it will be appreciated that a number of different generation arrays, whether at different homes or located together in a larger array, can be controlled as a single entity from the point of view of the grid authority. Accordingly, the control of the plurality of inverters is simplified. Additionally, the central control of the plurality of inverters allows the inverters to operate in a coordinated fashion and as such potentially contribute to improving the stability of the grid.

Figure 7:
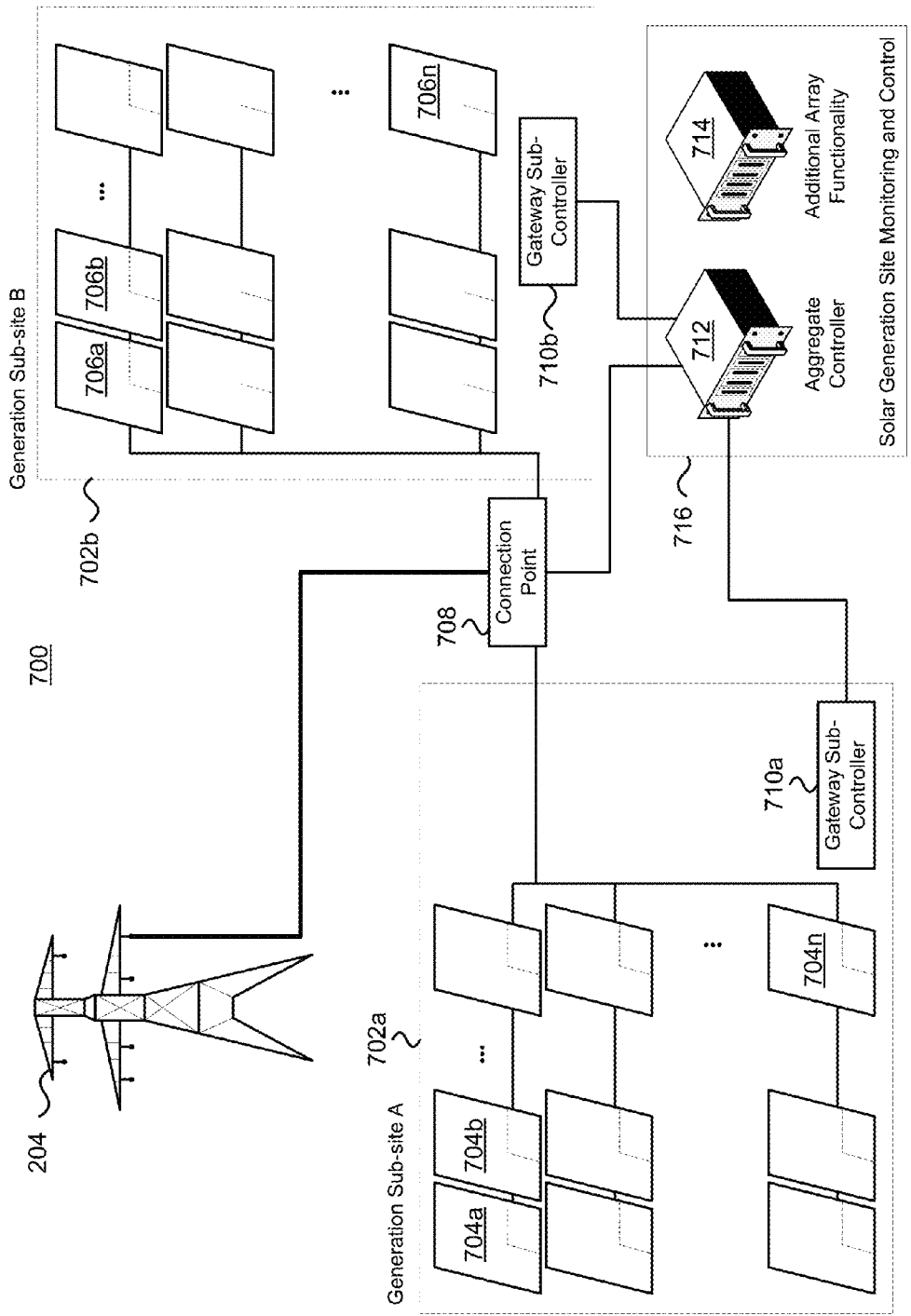
FIG. 7 depicts a further illustrative embodiment of a power generation and control system.

FIG. 7 depicts a further illustrative embodiment of a power generation and control system. In contrast to the power generation and control systems 500 and 600, which were depicted as having the PV panels installed in homes and connected to a low voltage portion of the distribution network, the power generation and control system 700 is depicted as a larger-scale solar generation site, sometimes referred to as a solar farm. The solar generation site is depicted as having two sub-sites 702*a*, 702*b*. Each of the generation sub-sites 702*a*, 702*b* comprise a number of PV units 704*a*, 704*b*, 704*n*, 706*a*, 706*b*, 706*n* (referred to collectively as PV units 704 and 706). Each of the individual PV units 704, 706 comprise a PV panel and an inverter. The AC output of the individual PV units 704, 706 is connected to a connection point 708 that connects the solar generation site to the electrical grid 204. It is assumed that a relatively large amount of power is generated at the solar generation site, and as such the connection point 708 connects the solar generation site to a medium voltage portion of the distribution network. The connection point 708 may comprise transformers for stepping-up the voltage to the required voltage of the medium voltage portion.

As depicted, the PV panels 704, 706 are grouped into two sub-sites 702*a*, 702*b*. The sub-sites may be the result of the geographic location of the PV units or may be grouped together based on the number of PV units in sub-site. Regardless of how the PV units 704, 706 are arranged into a sub-site, the PV units of each sub-site are controlled by a respective gateway sub-controller 710*a*, 710*b*. In turn each of the gateway sub-controllers 710*a*, 710*b* is controlled by an aggregate controller 712. As previously described, the functionality of a gateway controller is distributed between the aggregate controller 712 and the gateway sub-controllers 710*a*, 710*b*. The gateway sub-controllers 710*a*, 710*b* may be located at the geographic location of the respective generation sub-sites 702*a*, 702*b* and may communicate with the PV units. It is contemplated that the gateway sub-controllers 710*a*, 710*b* may be located remotely from the respective generation sub-sites; however in such a case the communication between the PV units and the gateway sub-controllers may be more complicated due to the distances involved.

Regardless of the location of the gateway sub-controllers, the aggregate controller 712 may be located in monitoring and control facility of the solar generation site. The aggregate controller 712 is depicted as being provided by a server located on-site, however it is contemplated that the aggregate controller could be provided at a location remote from the entire solar generation site, and may communicate with the gateway sub-controllers 710*a*, 710*b* using various means such as the internet or wireless technologies such as cellular or WiMax. The solar generation site monitoring and control location 716 may further provide additional array functionality 714. The additional array functionality 714 may include functionality for operating the solar generation site, such as monitoring the output of individual PV units for identifying PV units that are not operating to their full potential, mapping locations of individual PV units within the generation array to facilitate maintenance of the PV units, as well as additional functionality that may be useful to the maintenance and operation of the solar generation site.

Figure 8:
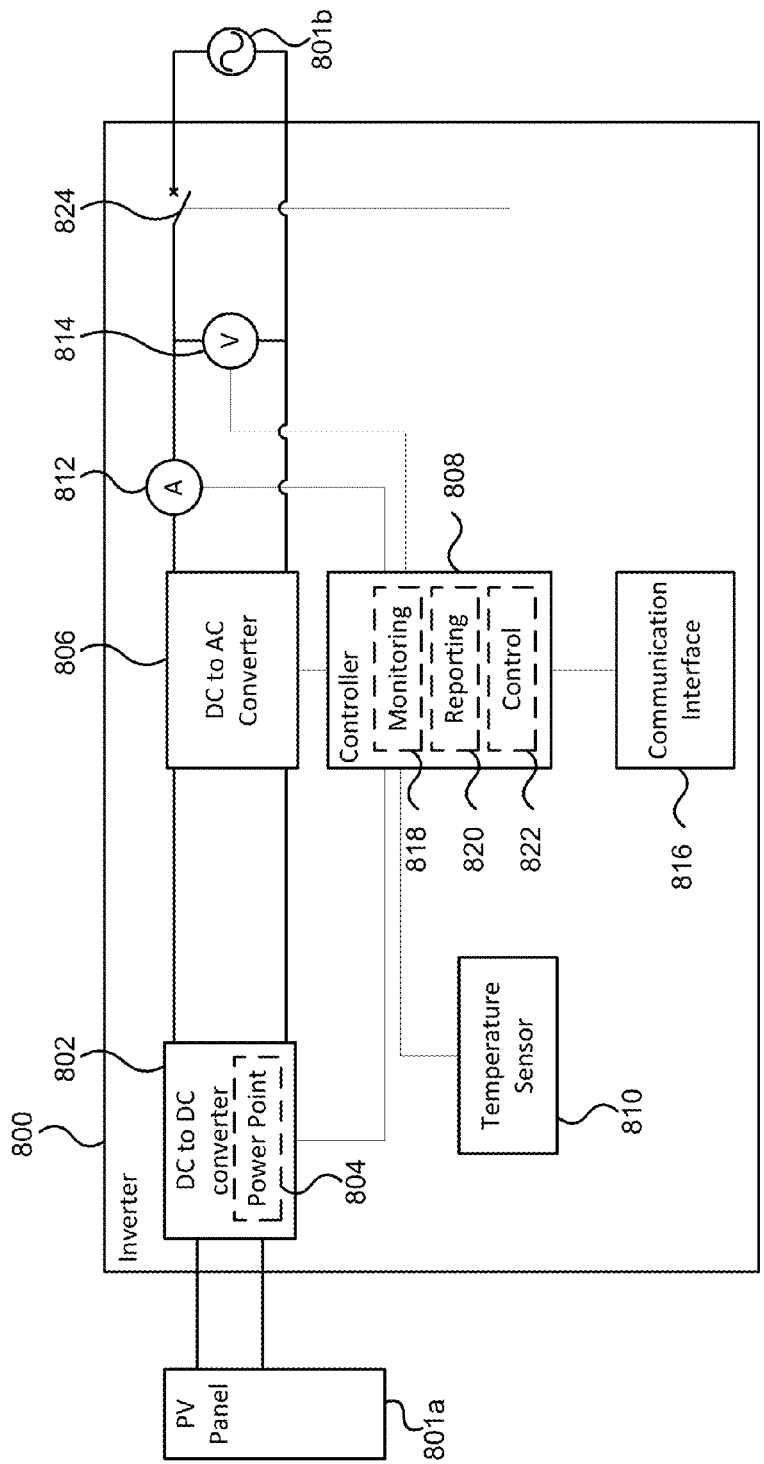
FIG. 8 depicts illustrative components of an inverter for use with a photovoltaic panel.

FIG. 8 is a block diagram of the components of an inverter for use with a photovoltaic panel in accordance with the power generation and control functionality described above. The inverter 800 receives a DC input from a PV panel 801*a* and provides an AC output 801*b*. The inverter 800 comprises a DC to DC converter 802 which receives DC power from the PV panel 801*a* and converts it to another voltage that is provided to a DC to AC converter 806. The DC to DC converter 802 may incorporate power point control functionality 804 for adjusting the operating characteristics, such as the voltage, of the PV panel 801*a* in order to adjust the power produced by the PV panel. The power point control functionality may determine the panel setting or may receive the panel setting from, for example, a gateway controller. The power point control functionality may employ maximize power point tracking (MPPT) functionality for determining the panel setting that will produce the maximum power for current insolation conditions. MPTT determines the panel settings for producing the maximum the power output of the PV panel. The DC to AC converter 806 provides AC power 801*b*. As described above, the output of the inverter 800 may be coupled with other inverter outputs to a connection point to the power grid. The inverter 800 is depicted as having a controller 808 for controlling operating characteristics of the inverter. The controller may be provided, for example, by a microprocessor, processor, Application Specific Integrated Circuit (ASIC), Field Programmable Gate Array, or through other electronics. The controller 808 may receive information from one or more sensors of the inverter 800. For example, the inverter may include a temperature sensor 810 for measuring temperatures. Although only a single temperature sensor 810 is depicted, the inverter may comprise a plurality of temperature sensors for monitoring various temperatures, such as temperatures of different inverter components as well as ambient temperatures. The inverter 800 may further comprise an ammeter 812 and a voltmeter 814 for measuring a current and voltage output from the DC to AC converter respectively. Although not depicted, the inverter may include additional ammeters and/or voltmeters, for example to measure the current and/or voltage provided from the DC to DC converter to the DC to AC converter as well as an ammeter and/or voltmeter for measuring the current and/or voltage provided from the PV panel to the DC to DC converter. The inverter 800 may further comprise a communication interface 816 for communicating with a gateway controller. The controller 808 may comprise monitoring functionality 818 for monitoring one or more operating characteristics of the inverter, including output characteristics of the power. The controller 808 may also comprise reporting functionality 820 for reporting the monitoring information, or portions of the monitoring information to a gateway controller using the communication interface 816. The controller 808 may further comprise control functionality 822 for controlling the operation of the inverter. The control functionality 822 may receive commands from a gateway controller and adjust one or more control parameters in order to adjust the operation of the inverter. For example, the command may include instructions for increasing the power produced, which may require the controller adjusting one or more control parameters of the power point functionality in order to increase, if possible, or decrease the power produced by the PV panel. The commands may further involve a command to disconnect the inverter so that it provides no power. This may be achieved by a controllable switch 824 of the inverter 800.

Figure 9:
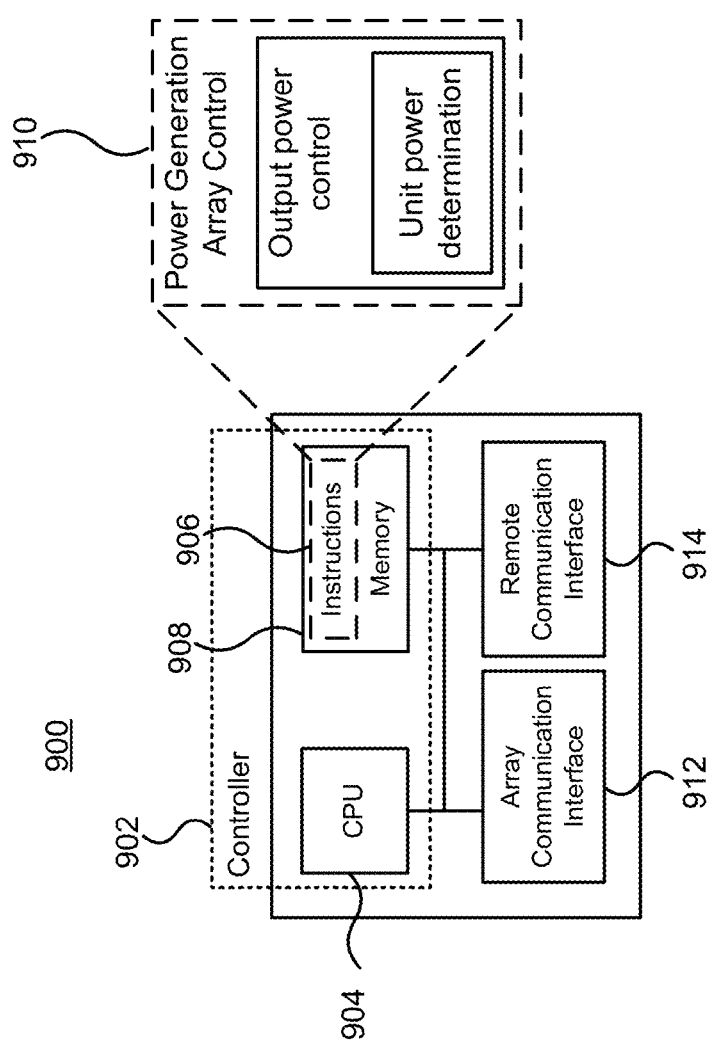
FIG. 9 depicts illustrative components of a gateway controller.

FIG. 9 depicts components of a gateway controller. The gateway controller 900 may comprise a controller 902 provided by a central processing unit (CPU) 904, microprocessor, processor, Application Specific Integrated Circuit (ASIC), Field Programmable Gate Array or other similar component capable of executing instructions 906 stored in memory 908. The memory 908 may be a collection of both volatile memory, such as registers, cache memory and RAM, as well as non-volatile memory, which may include, ROM, flash memory, hard drives, or solid state drives. When the CPU 904 executes the instructions 906 it configures the gateway controller 900 to provide power generation array control functionality 910. The power generation control functionality 910 may provide the functionality of the gateway controllers 224, 324 and 424 described above. The gateway controller further comprises an array communication interface 912 for communicating with inverters associated with the gateway controller, one or more connection points associated with the gateway controller 900, as well as a remote communication interface for communicating with other entities, including a grid authority and supervisory functionality which is not depicted in FIG. 9.

Figure 10:
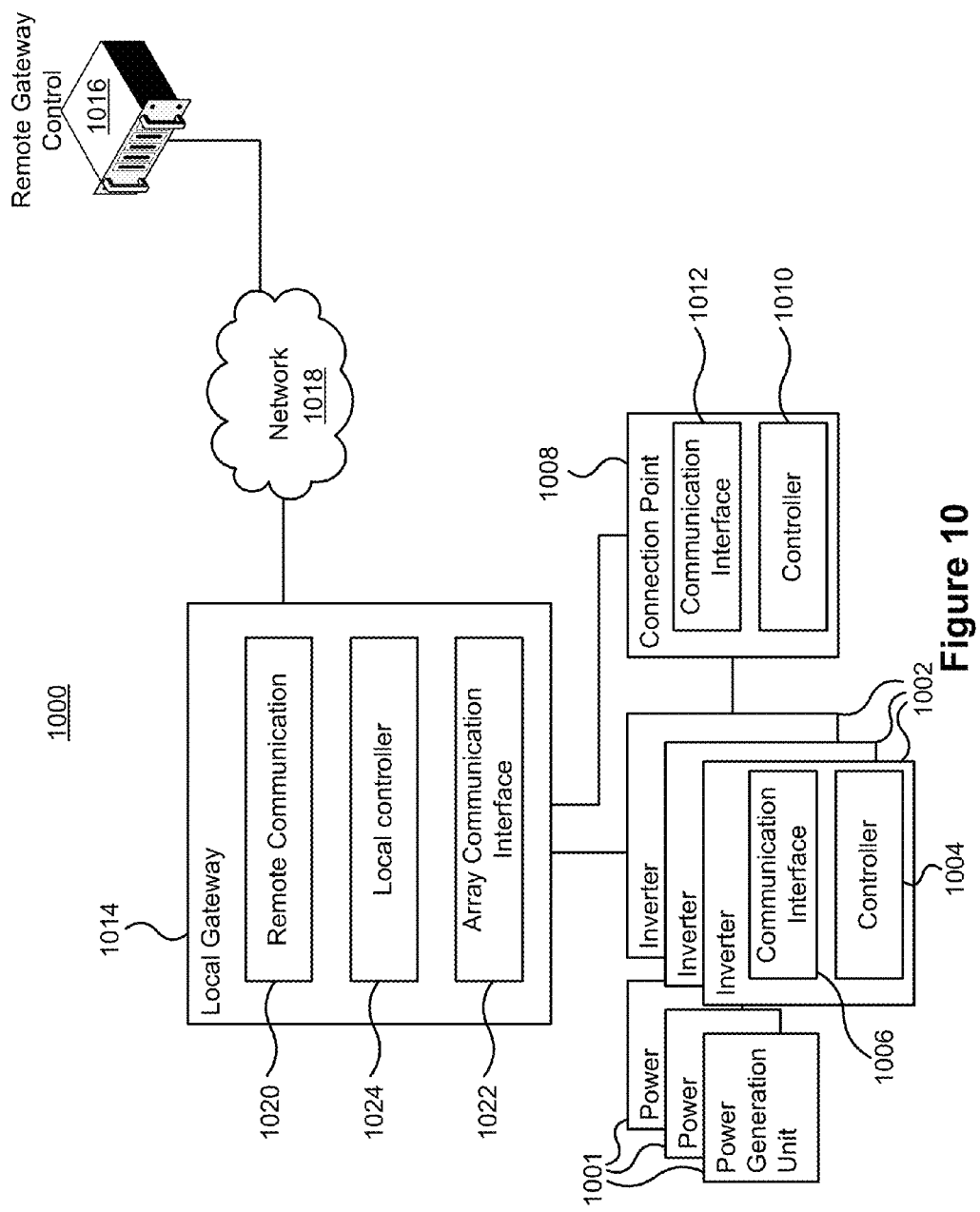
FIG. 10 depicts illustrative components of a coordinated power generation group.

FIG. 10 depicts components of a coordinated power generation group. Although a gateway controller 900 was described above with regard to FIG. 9 as being provided by a single physical component, it is contemplated as described above that the gateway controller may be implemented by a number of separate components that operate together. For example, a gateway controller may be provided by one or more local gateways which are in turn controlled by a remote gateway control.

As depicted in FIG. 10, the coordinated power generation group 1000 comprises a plurality of inverters 1002 associated with respective power generation units 1001, each of which comprise a controller 1004 and a communication interface 1006. The controller 1004 may adjust one or more control parameters of the inverter in order to adjust the output provided by the inverter. Each of the inverters 1002 is connected to a connection point 1008 that couples the output from the plurality of inverters 1002 to an electrical grid or bus (not depicted in FIG. 10). The connection point comprises a controller 1010, which may provide monitoring functionality for monitoring one or more output characteristics of the power supplied to the grid from the plurality of inverters, as well as one or more characteristics of the electrical grid. The connection point may include a communication interface 1006. Both the connection point 1008 and the inverters 1002 may communicate with a gateway controller.

In contrast to FIG. 9, which depicted the gateway controller as being provided by a single component, the gateway controller of FIG. 10 is provided by a local gateway 1014 and a remote control gateway 1016. The local gateway and the remote control gateway may communicate with each other using various means, including the internet 1018 as depicted. The local gateway comprises a remote communication interface 1020 for communicating with at least the remote gateway control 1016 and an array communication interface 1022 for communicating with the inverters 1002 and connection point 1008. The functionality of the gateway controllers described above, including the power generation array control 910 which was described as being provided by a single component, may be divided between the local gateway 1020 and the remote gateway control 1016.

Although only a single local gateway 1014 is depicted in FIG. 10, it is contemplated that additional local gateways, each controlling a plurality of inverters coupled to a connection point, may be controlled by the remote gateway control 1016. Further, it is contemplated that additional remote gateway controls 1016 may in turn be controlled by an additional remote gateway control.

Regardless of the specific division of the gateway controller functionality among components, the gateway controller functionality may be responsible for control and monitoring of power generation arrays associated with the gateway controller. The generation arrays, or more particularly the power generation units or more particularly still the inverters, may be associated with the gateway controller manually in an initial setup phase, automatically during an initial setup phase, manually throughout the operation the array or automatically throughout the lifetime of the array. The gateway controller functionality may send commands to selectively control the operation of individual power generating components. The commands can be transmitted to a single inverter within the power generation array, multiple inverters or all inverters in a power generation array. The commands issued by the gateway controller functionality to the plurality of inverters allows the plurality of power generating units 1001 to behave as a single power generation unit.

Figure 11:
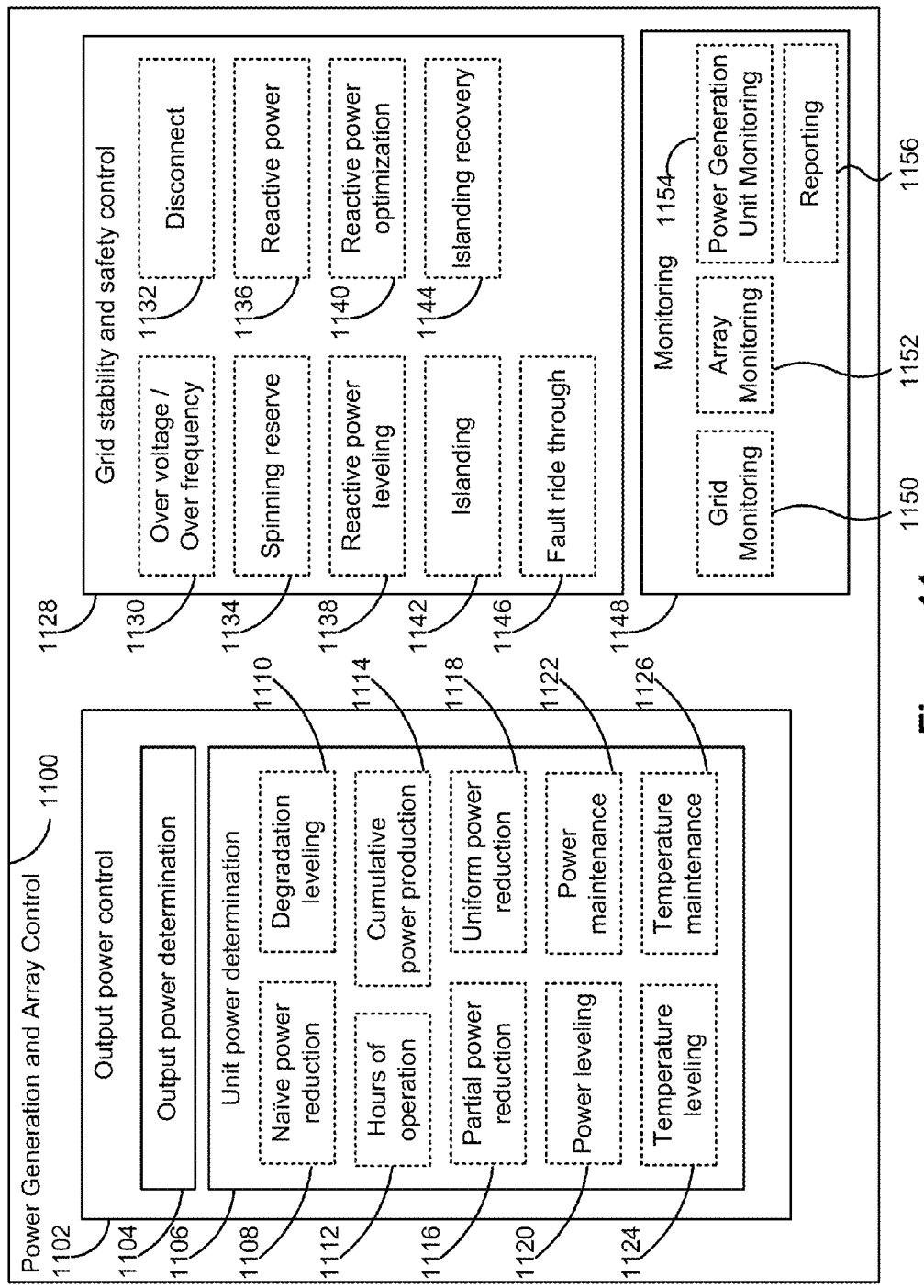
FIG. 11 depicts illustrative functionality of a gateway controller.

FIG. 11 depicts functionality for power generation array control. As described above the power generation and array control functionality 1100 maybe provided by distributed components in the power generation and control system infrastructure. The power generation and array control functionality 1100 may comprise various functionalities. These functionalities may be grouped generally as output power control functionality 1102, grid stability and safety control functionality 1128 and monitoring functionality 1148. The monitoring functionality 1148 may comprise grid monitoring functionality 1150 for monitoring characteristics, such as voltage, frequency and phase of the electrical grid, array monitoring functionality 1152 for monitoring characteristics of the current input to the grid from the generation arrays controlled by a gateway controller, and power generation unit monitoring functionality 1154 for monitoring characteristics of the individual power generation units. The monitoring functionality 1148 may further comprise reporting functionality 1156 for reporting the monitored information to a remote location.

Although depicted as being separate functionality, it will be appreciated that the various functionality may be intertwined with each other and the separation is intended to aid in fully describing each piece of functionality.

As described above, a gateway controller may determine control parameters of individual inverters in order to adjust a characteristic of the combined output provided by the plurality of inverters controlled by the gateway controller. The output characteristic may be adjusted in order to match a desired combined characteristic, which may be received from an external location, such as from a grid authority. Additionally or alternatively, the desired combined characteristic may be determined by the gateway controller, for example based on monitored characteristics of the electrical grid.

In one embodiment the output characteristic that is adjusted may be the combined output power provided to the electrical grid from the plurality of individual inverters. The gateway controller may determine the power output required to be provided by each individual inverter in order to supply the desired output power to the electrical grid, and then set the control parameters of the individual inverters in order to provide the desired combined output power.

An individual inverter may control its output power by controlling the amount of DC current which its respective PV panel produces. A PV panel has a characteristic current versus voltage curve for a given amount of insolation. Panel current decreases monotonically with increasing output voltage, becoming zero at the panel's open circuit voltage $V_{OC}$. The output current of the panel can therefore be controlled by controlling the value of the load presented by the input of the inverter. There is a point on a PV panel's current versus voltage characteristic called the Maximum Power Point (MPP) which corresponds to its maximum power production. In the absence of any requirement to limit output power, an inverter will attempt to maximize output power by keeping the panel at the MPP. In response to a request to reduce power the inverter would adjust the output voltage and move the panel away from its MPP point. The power level at the MPP represents the panels' maximum available power $P_{AVA}$. An inverter's actual output power can therefore differ from its available output power.

The output power determination functionality 1104 may determine the desired power output provided to the electrical grid from the plurality of inverters. An indication of the desired output power may be received at the gateway controller, or the desired output power level may be determined based on monitored characteristics of the electrical grid. For example, if the frequency of the power on the electrical grid increases above a threshold, the power supplied to the grid from the plurality of inverters may be decreased. Once the desired output power level is determined, the unit power determination functionality 1106 may determine the required output power levels of the individual inverters and set the control characteristics of the inverters accordingly.

The unit power determination functionality 1106 may determine the required output power levels of individual inverters in various ways. Illustrative ways of determining the output power levels of individual inverters required to meet the desired combined output power level are described in further detail below, however they may include naïve power reduction functionality 1108, degradation leveling functionality 1110, hours of operation functionality 1112, cumulative power production functionality 1114, partial power reduction functionality 1116, uniform power reduction functionality 1118, power leveling functionality 1120, power maintenance functionality 1122, temperature leveling functionality 1124 and/or temperature maintenance functionality 1126.

Naïve Power Reduction

In naïve power reduction, the output power of the combined PV array is reduced by gateway controller sending commands through communication link to selected inverters to completely stop injecting power into the grid. Inverters are controlled to stop their power production until the desired power output is met. For example, if a 10% power reduction is required, a number of inverters with a combined power output of 10% of total production are controlled to stop their power injection into the grid while the remaining inverters continue to inject power into the grid. This is referred to as naïve power reduction as it does not take into consideration other factors that may be used to select the output levels of individual inverters. As describe further, controlling the inverter output in a more informed manner may extend the overall operating lifetime of the generation array.

Degradation Leveling

In degradation leveling, the inverters instructed to stop injecting power into the grid are chosen so as to extend their operating lifetime and delay their replacement. The lifetime of electronic components is generally dependent on their hours of operation. Lifetime generally decreases with increased operating temperature and hours of operation. In degradation leveling an inverter degradation function is created and a degradation value calculated for all inverters. In the event of a power reduction requirement those inverters with the largest degradation values are selected to cease injecting power before those with smaller degradation values. In this way degradation of inverters is equalized across all inverters in the array. There are multiple possible degradation functions.

Hours of Operation

In one embodiment of degradation leveling, referred to as hours of operation, the degradation function is the total hours of operation of an inverter. In the hours of operation embodiment a record of the total hours of operation for each inverter in the array is maintained. The record of total hours of operation may be maintained by the inverter itself. In this embodiment the inverter contains an on board clock for logging hours of operation. In another embodiment the total hours of operation may be maintained by the gateway controller. In response to a power reduction request, the gateway controller selects a sufficient number of the inverters to cease power injection based on their hours of operation. The inverters with the most hours of operation are selected to cease power injection, to meet the required power reduction. In this manner the field lifetime of inverters can be advantageously extended and replacement of inverters that are at their end of life advantageously delayed. This embodiment may be potentially useful in a situation where a power generation array was built in stages and all inverters and panels were not installed at the same time. Although described as the total hours of operation of an inverter, the degradation function may alternatively be the amount of time the inverter has been in the installation array.

Cumulative Power Production

In cumulative power production, a degradation function used to select the inverters that will stop power injection is the cumulative power production of the inverter. In this embodiment a record of the total power production of each inverter, summed over its lifetime is maintained. This record may be maintained by the inverter itself or by the gateway controller. In response to a power reduction request, the gateway controller selects a sufficient number of the inverters to cease power injection in order of their total power production. The inverters with the highest total power production are selected to ceases power injection to meet the required power reduction. This embodiment may be potentially useful when there are significant variations in power production across an array such as, for example, on different sides of a building or different parts of a roof.

More sophisticated degradation functions are possible. In another embodiment the degradation function is the total hours of operation of the inverter weighted by an acceleration factor that is dependent on the inverter operating temperature. The lifetime of electronic components generally has an exponential dependence on operating temperature. In one embodiment the acceleration factor (AF) is an exponential function of the form $$AF = e^{\frac{E_A}{K(T_2 - T_1)}}$$

where $E_A$ is an activation energy characteristic of the inverter's failure lifetime, K is Boltzmann's constant, $T_2$ is the inverter operating temperature, $T_1$ is the rated temperature of the inverter and the degradation function is of the form $$D = \int_0^T t * AF \, dt$$

Where D is the degradation value, t is time and the integration is over "T" the total operating time of the inverter.

Simpler embodiments are also possible. In one embodiment the inverters instructed to cease power injection are those inverters with the highest operating temperatures. Since the lifetime of electronic components decreases exponentially with temperature, shutting down the hottest inverters will advantageously increase their life. In another embodiment the inverters instructed to ease production are those with the highest power outputs.

Partial Power Reduction

In another embodiment the output power of the generation array is reduced by gateway controller sending commands for selected inverters to reduce but not completely cease power injection while the remaining inverters remain at their maximum power points. For example, if a 10% power reduction is required, the selected inverters are controlled such that the reduction in their combined power output amounts to 10% of total production while the remaining inverters continue to inject power into the grid. Any of the above described degradation functions can be used to select the inverters that will partially reduce their power production.

Uniform Power Reduction

In another embodiment the power output of all inverters is reduced by a common absolute amount. For example, if the array output must be reduced by an amount of power $\Delta P_{ARRAY}$ in watts then each inverter is instructed to reduce its output by an amount $\Delta P_i$ where:

$$\Delta P_i = \Delta P_{ARRAY}/N$$

And N is the number of inverters in the array. This embodiment may be potentially useful when a very fast response is required to the power reduction request. The response may be quick since the same command instructing the reduction by $\Delta P_i$ can be broadcast to all inverters at once, instead of requiring sending individual commands to individual inverters. In some circumstances however, it may be that the requested power reduction ($\Delta P_i$) is greater than the current power output of the inverter ($P_i$), for a particular inverter and it will not be possible for the inverter to reduce its output by the requested amount. This may occur when the power reduction request is very large and/or the output power of a particular inverter is very small. In this case, if there are M inverters where $\Delta P_i > P_i$ then these M inverters completely cease injecting power into the grid and the remaining inverters have their power adjusted by the corrected amount $\Delta P_i$ ' where $$\Delta P_i' = \frac{\Delta P_{ARRAY} - \sum_{i=1}^{M} P_i}{N - M}$$

In another embodiment the output power of PV array is reduced by gateway controller sending commands for all inverters to reduce their power output by an identical fractional amount. For example, if a 10% reduction in total power output is required gateway controller instructs all inverters to reduce their output by 10%. This embodiment may be potentially useful in situations where a very quick response to a power reduction request is required and does not suffer from the complication of $\Delta P_i > P_i$ as in the previous method.

Power Leveling

The lifetime of electronic components has a strong and exponential dependence on operating temperature. It may therefore be advantageous to control all inverters to be at substantially the same temperature and so extend the average inverter lifetime. Operating temperature is partially dependent on the output power of the inverter. In normal operation an inverter's output power will vary across the array and depends on the state of the solar panel to which it is attached. It may depend on the orientation, shading, soiling, age and manufacturing variations of the panel. If the output power of the array needs to be reduced to meet grid requirements it may therefore be beneficial to adjust the power output of all inverters such that they approach a common power output value and extend the average inverter lifetime. This technique may be referred to as power leveling.

In one embodiment the gateway controller calculates the required common output power value. For example, if the required total array power is $P_{ARRAY}$ then for an array of N inverters of equal capacity the common value $P_{INV}$ is just $$P_{INV} = P_{ARRAY}/N$$

All inverters report their current output power to gateway controller which then calculates the individual required power adjustment for each inverter. Power adjustment commands are then sent to all inverters in the panel array to bring their output power to the same value, advantageously extending the average lifetime of the inverters as a group. In some embodiments the power adjustment command might be for the inverter to reduce its power by an amount $\Delta P_i$. In other embodiments it may be a command for the inverter to increase its output power to $P_{INV}$.

In some situations, however, it may be that the common value $P_{INV}$ exceeds the available power output of some inverters. These might be for example, inverters whose PV panels are experiencing shading, soiling, clouds, reduced solar conversion efficiency or have an orientation which does not capture as much solar insolation as other panels. If there are M inverters whose power output is below $P_{INV}$ then the power of these inverters is not adjusted and the power of the remaining N-M inverters is decreased to a common value $P_{INV}$ given by the equation $$P_{INV} = \frac{P_{ARRAY} - \sum_{i=1}^{M} P_i}{N - M}$$

Where M is the number of inverters with output power below $P_{INV}$ and $\sum_{i=1}^{M} P_i$ represents the summation of their output power.

Power Maintenance

Figure 12:
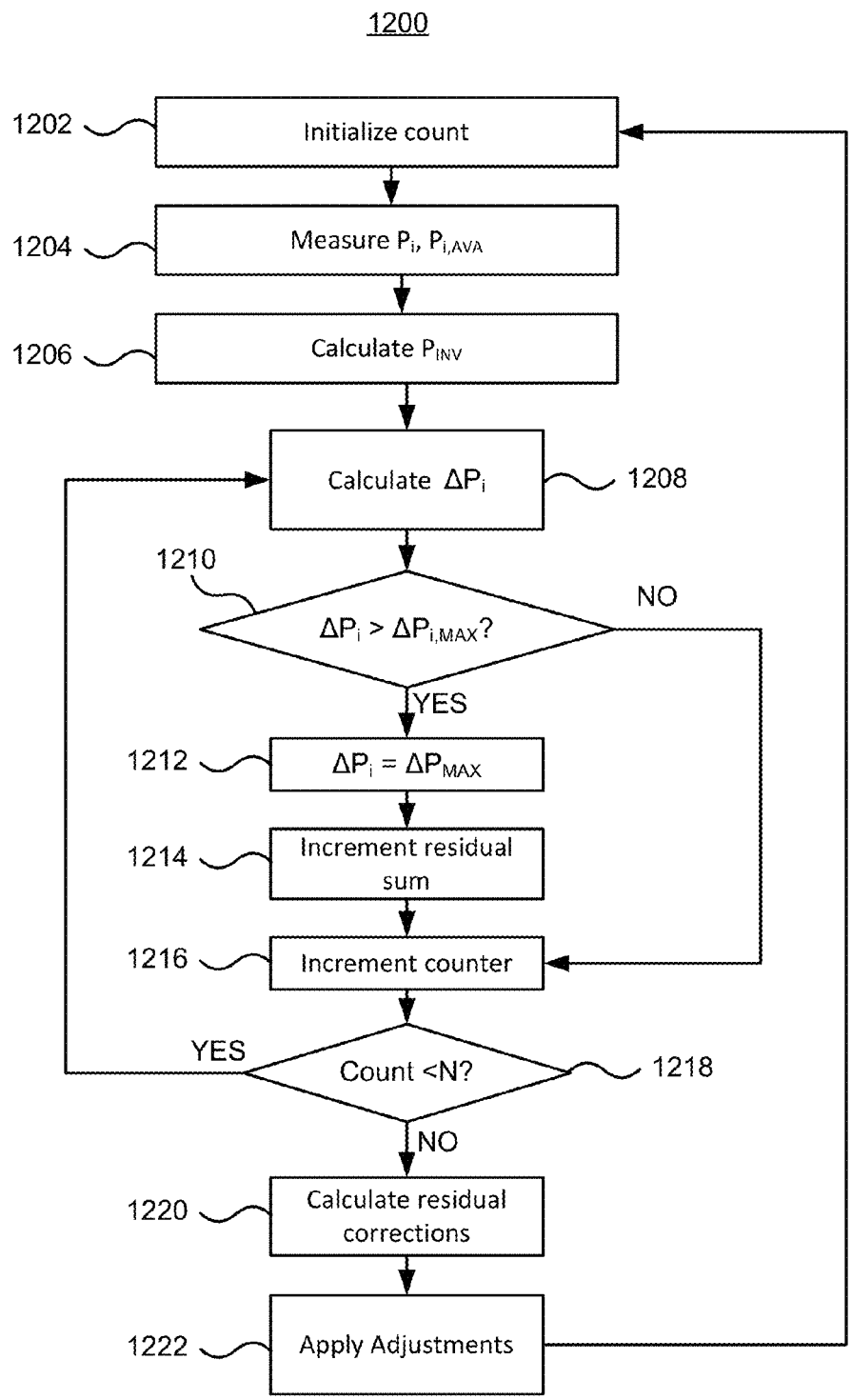
FIG. 12 depicts a method of constant array power maintenance.

In another embodiment the gateway controller controls the output power of individual inverters to maintain the generation array's output power at a specific value. In this embodiment the array is required to maintain its total output power at a constant value under the normal variation in the value of solar insolation caused by such factors as change in the time of day or passing clouds. FIG. 12 is a flow chart showing a constant array power maintenance method.

The example method 1200 involves continual adjustments of the output power of individual inverters in the array proportional to the amount by which they deviate from a common value $P_{INV}$. The gateway controller initializes a counter, i, that will count over each of the inverters in the generation array (1202). The gateway controller measures the individual inverter's power, both actual power $P_i$ and available power $P_{i,AVA}$. (1204). The available power corresponds to the power a panel could output if it were operated at its Maximum Power Point (MPP). The required common inverter power $P_{INV}$ is calculated (1206) using the formula:

$$P_{INV} = P_{ARRAY}/N$$

The power adjustment $\Delta P_i$ for the inverter i is calculated (1208). In one embodiment this adjustment is proportional to the amount by which the actual inverter power differs from the common value $P_{INV}$ and is given by the formula:

$$\Delta P_i = P_{INV} - P_i$$

In this embodiment, the output power of inverters with powers greater than the common value are decreased and the output power of inverters with powers lower than the common value are increased.

It may be that some inverters have output powers close to their available output power and cannot increase their power by the calculated adjustment $\Delta P_i$. A determination as to whether the calculated adjustment exceeds the maximum possible increase ($\Delta P_{i,MAX}$) is made (1210) where $\Delta P_{i,MAX}$ is defined as:

$$\Delta P_{i,MAX} = P_{i,AVA} - P_i$$

If the requested increase exceeds the maximum possible increase (Yes at 1210) then the inverter is assigned the maximum possible increase (1212).

The difference between the actual power increase $\Delta P_{i,MAX}$ and the required increase $\Delta P_i$ is added to a running total of power residuals $P_{RES}$ (1214) using the formula:

$$P_{RES} = P_{RES} + \Delta P_i - \Delta P_{i,MAX}$$

After power residual is calculated, or if the adjustment did not exceed the maximum possible increase (No at 1210) the counter i is incremented (1214) and a check is made to determine if the counter is less than the number of inverters N in the array (1216). If the counter is less than N (Yes at 1216) the $\Delta P_i$ is calculated for the next inverter i (1208). Once adjustments $\Delta P_i$ have been calculated for all the inverters in the array (Yes at 1216) a correction for the residual power is calculated (1218). A correction is applied to the output power adjustments $\Delta P_i$ of all inverters that were found at 1210 to not exceed their maximums. Their power adjustments are increased by an amount $$\frac{P_{RES}}{N - M}$$

Where M is the number of inverters where the required power adjustment $\Delta P_i$ exceeded their maximum power adjustments at 1210. The power adjustments are then applied to all inverters in the array by gateway controller (1220) and the process repeats, with the re-initialization of the counter (1202). In this manner all inverters are controlled to come to substantially the same output power, within the constraints of their available power output.

Temperature Leveling

In another embodiment, if the output power of the array needs to be reduced, the gateway controller attempts to reduce the power of individual inverters such that all inverters have substantially similar operating temperatures. This technique may be referred to as temperature leveling. Since the lifetime of electronic components generally decreases with increasing operating temperature bringing all inverters to the same operating temperature will equalize their lifetimes and increase the time between repair or replacement.

In this embodiment inverters report their internal temperature to gateway controller which then calculates individual power adjustments for the inverters which will meet the required reduction in total power of the generation array but preferentially reduces the output power of the hottest inverters, causing a reduction in their internal temperature and bringing all inverters closer to the same temperature. Power adjustment commands are then sent from the gateway controller to the inverters in generation array.

In one embodiment, if the required reduction in total array power is $\Delta P_{ARRAY}$ then the power adjustment applied to the i-th inverter ($\Delta P_i$) is given by the equation $$\Delta P_i = \frac{T_i \Delta P_{ARRAY}}{N T_{AVE}}$$

Where $T_{AVE}$ is the average inverter temperature of the array, $T_i$ is the temperature of the i-th inverter and N is the number of inverters in the array. Inverters with temperatures greater than $T_{AVE}$ will have their output power decreased by an amount greater than the average power adjustment while inverters with temperatures lower than $T_{AVE}$ will have their output power decreased by an amount less than the average power adjustment. This embodiment may be potentially useful in a large panel array when a fast response is required to the power reduction request.

Figure 13:
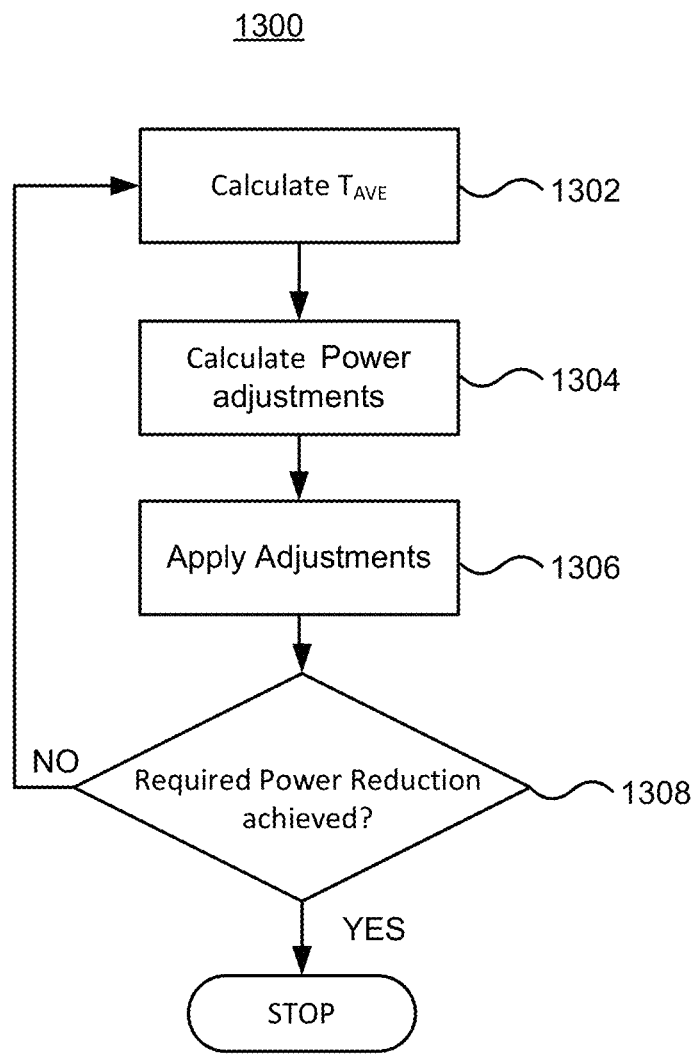
FIG. 13 depicts a method of temperature leveling.

FIG. 13 is a flow chart illustrating another temperature leveling method. The example method 1300 involves reducing the output power of the array in a series of increments. In this embodiment all inverters in the array report their temperatures to the gateway controller which then calculates the average inverter temperature (1302). Power adjustment $\Delta P_i'$ for all inverters in the array is calculated by the gateway controller (1304). These power reductions $\Delta P_i'$ are some fraction of the amounts calculated in the previous formula. For example, $\Delta P_i'$ might be:

$$\Delta P_i' = K * \Delta P_i$$

Where K has a value of between zero and one. The calculated power reductions are then applied to all inverters in the array (1306). The method determines if the required total power reduction $\Delta P_{ARRAY}$ has been achieved (1308) after a suitable settling time. If it has not been achieved (No at 1308) then inverter temperatures are re-calculated (1302) and a second set of power adjustments calculated and applied. The process proceeds iteratively until the required power reduction has been achieved (Yes at 1308).

In some embodiments K might not be a fixed value but might be a fractional series which sums to one such as ½, ¼, ⅛, 1/16, 1/16).

Temperature Maintenance

In another embodiment the gateway controller controls the output power of individual inverters to maintain their temperatures as close to the same value as possible for a given array output power requirement. In this embodiment the array is required to maintain its total output power at a constant value.

Figure 14:
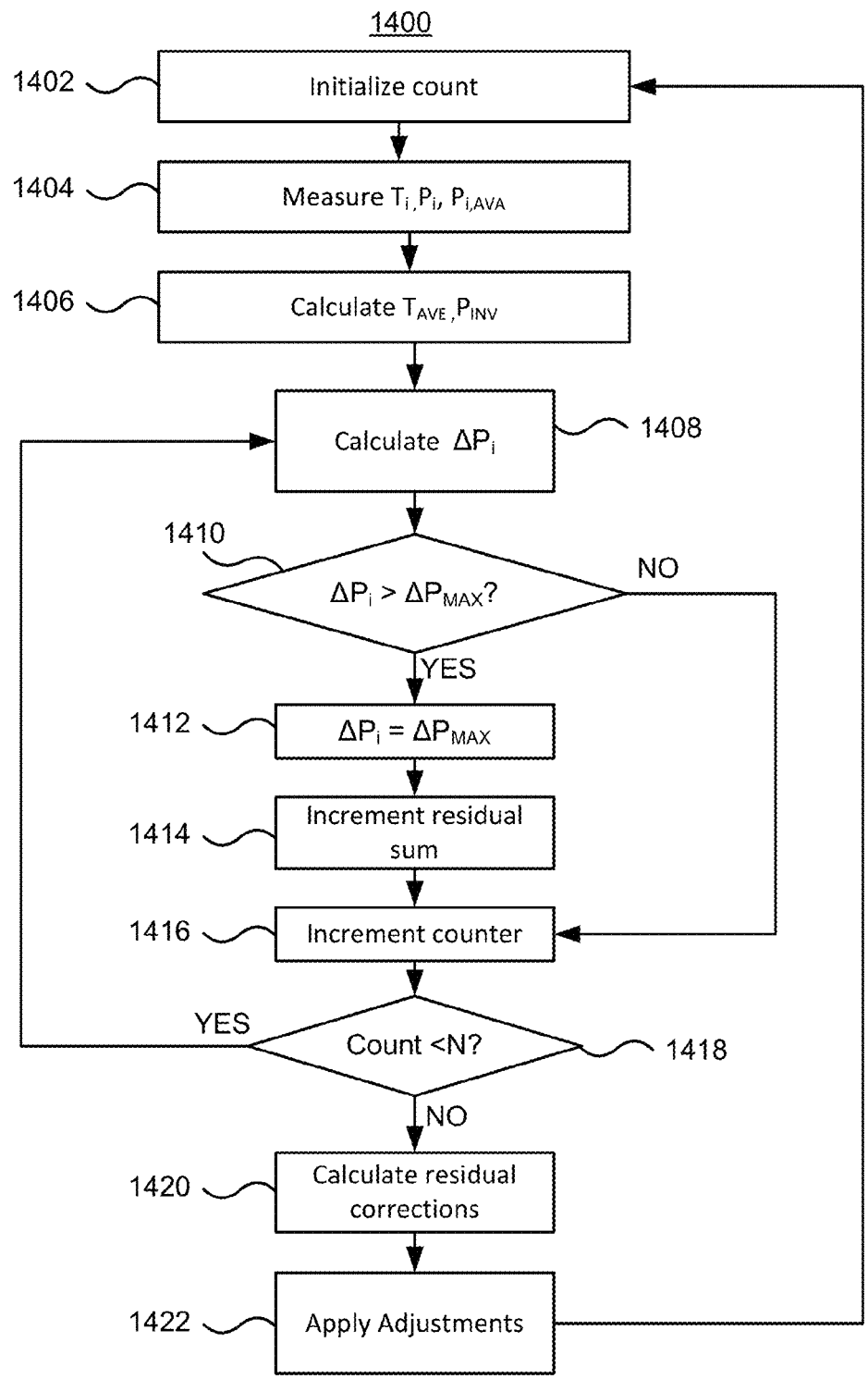
FIG. 14 depicts a further method of temperature leveling.

FIG. 14 is a flow chart showing a temperature leveling method under a constant array power requirement. The example method 1400 involves continual adjustments of the output power of individual inverters in the array proportional to the amount by which they deviate from the average array temperature. A counter, i, is initialized (1402) to count over each of the inverters in the array. The gateway controller measures individual inverter temperatures $T_i$, actual inverter output power $P_i$ and available inverter output power $P_{i,AVA}$ (1404). The gateway controller calculates the average inverter temperature $T_{AVE}$ and the required average inverter output power $P_{INV}$ (1406). The required average inverter output power is the required array power divided by the number of inverters, N, in the array. The power adjustment $\Delta P_i$ for the inverter i is calculated (1408). In one embodiment this adjustment is proportional to the amount by which the inverter temperature differs from the average temperature and is given by the formula:

$$\Delta P_i = K \frac{(T_i - T_{AVE})P_{INV}}{T_{AVE}}$$

Where K is a constant and controls the feedback response. In this embodiment, the output power of inverters with temperatures greater than the average are decreased and the output power of inverters with temperatures lower than the average are increased.

It may be that some inverters are close to their maximum output power and cannot increase their power by the calculated adjustment $\Delta P_i$. A determination is made to determine if $\Delta P_i > \Delta P_{i,max}$ (1410). $\Delta P_{i,MAX}$ is defined as $$\Delta P_{i,MAX} = P_{i,AVA} - P_i$$

If the calculated adjustment $\Delta P_i$ does not exceed the maximum adjustment (No at 1410) then the adjustment for the inverter is not changed from its calculated value and the counter is incremented (1416).

If $\Delta P_i > \Delta P_{i,MAX}$, (Yes at 1410), then the adjustment for the inverter ($\Delta P_i$) is set equal to $\Delta P_{i,MAX}$ (1412) and the residual sum $P_{RES}$ is incremented (1414) using the formula:

$$P_{RES} = P_{RES} + \Delta P_{i,MAX}$$

$P_{RES}$ is a running total of the array adjustment power errors.

After incrementing the residual sum, or if $\Delta P_i$ was less than or equal to $\Delta P_{i,MAX}$, a determination is made to see if the counter is less than N (1418) and if it is (Yes at 1418) the adjustment for the next inverter ($\Delta P_i$) is calculated (1408). If the counter is greater than or equal to $\Delta P_{max}$ (NO at 1418) a correction for the residual power is calculated (1420). A correction is applied to the output power adjustments $\Delta P_i$ of all inverters that were found at 1410 to not exceed their maximums (No at 1410). Their power adjustments are increased by an amount $$\frac{P_{RES}}{N-M}$$

where M is the number of inverters were found to exceed their maximum power adjustments (Yes at 1410). The power adjustments are then applied to the inverters in the array (1422) by the gateway controller and after a settling time the process repeats with re-initialization of the counter (1402). In this manner all inverters are controlled to come to substantially the same temperature, within the constraints of their available power output.

In addition to the various techniques of reducing the total power supplied to the grid by the plurality of inverters described above, the power generation array control functionality of the gateway controller may provide additional functionality, referred to broadly as grid stability and safety control functionality 1128. The grid stability and safety control functionality may provide various functionality described further below, including for example, over voltage/over frequency functionality 1130, disconnect functionality 1132, spinning reserve functionality 1134, reactive power functionality 1134, reactive power leveling functionality 1138, reactive power optimization functionality 1140, islanding functionality 1142, islanding recovery functionality 1144 and fault ride through functionality 1146.

Over Voltage/Over Frequency

Existing inverters respond to an excess power condition on the grid such as when the grid voltage or frequency rises above a pre-programmed threshold by ceasing to inject power into the grid. The threshold values are typically mandated in the grid code of the grid authority. For example, on an electrical grid with a nominal frequency of 50 hertz an inverter might be required to cease power injection into the grid when the grid frequency exceeds 51.5 hertz. The grid can become unstable however, if all inverters in a large array cease power injection. In addition, the reduction in power output may be in excess of what is required to bring the voltage/frequency back to within its operating limits, wasting valuable generating capacity.

An emerging requirement for distributed generators is the ability to reduce their output power in proportion to departures of the grid frequency and voltage from its nominal values. For instance, in German code VDE-AR-N 4105 distributed generators are required to linearly reduce their output power once the grid frequency exceeds 50.2 hertz with a gradient of 40% of their active power at 50.2 hertz per hertz. In other words if the grid frequency is 51.2 hertz (one hertz greater than 50.2 hertz) the active power should be reduced by 40% of its value at 50.2 hertz.

Figure 15:
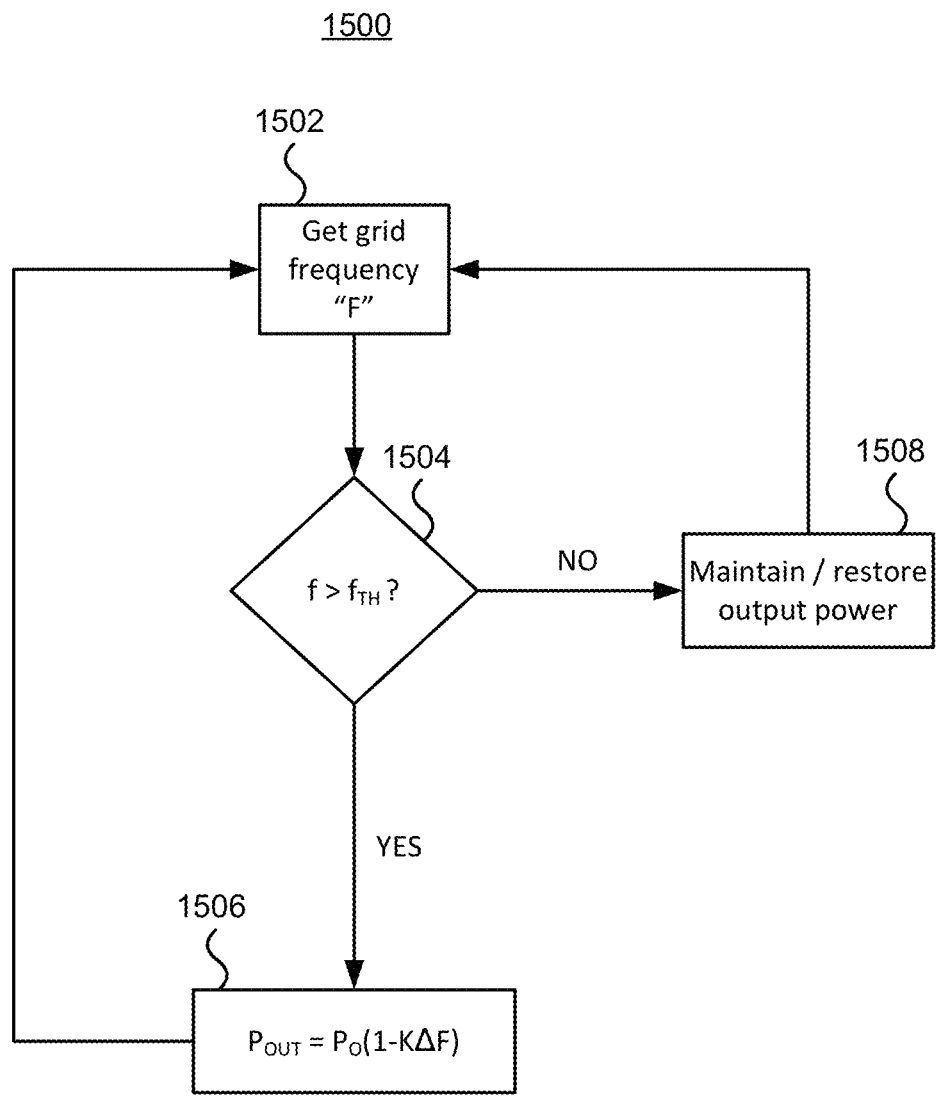
FIG. 15 depicts a method of grid stability control.

FIG. 15 is a flowchart illustrating an grid stability control method using a gateway controller. The method 1500 involves measurement of a parameter "f" of the electrical grid (1502). A determination is made as to whether the parameter exceeds a threshold value $f_{TH}$ (1504). If the parameter does exceed the threshold value (Yes at 1504) an adjustment of the array power may be made. The adjustment reduces the output power $P_{OUT}$ of panel array by an amount $P_{OUT}*K\Delta f$ where $\Delta f$ is the amount by which the parameter exceeds the threshold and is given by the formula $$\Delta f = f - f_{TH}$$

and K is a proportionality constant. Once the array power output is determined, the inverters can be controlled as described above in order to provide the desired output power.

Measurement of f might be performed by any of inverters in the generation array or the connection point if it includes monitoring functionality. The measurement of $f$ may be performed under the direction of the gateway controller.

If the threshold is not exceeded (No at 1504), the method will maintain or restore the output power to the power level generated before the threshold was exceeded ($P_O$). The grid parameter f may be continuously monitored and the output power of generation array continually adjusted by the gateway controller. This ensures that only the required power reduction occurs.

Disconnect

An additional requirement on distributed generators is that they completely cease injecting power when a grid parameter exceeds a maximum value. They may also be required to physically disconnect from the grid. For example, under German code VDE-AR-N 4105 distributed generators are required to disconnect from the grid when the grid frequency exceeds 51.5 hertz. In one embodiment the gateway controller monitors parameters of electrical grid 150 through any of inverters or connection point and issues an instruction to all inverters to disconnect from the grid when a threshold is exceeded. By controlling the inverter disconnection from the gateway controller, the disconnection threshold value for a plurality of inverters can be adjusted by adjusted the disconnection threshold at the gateway controller.

Spinning Reserve

The gateway controller can assist grid stability by maintaining a reserve of generating capacity that can quickly be brought on line in response to a power deficiency condition on the electrical grid. In one embodiment the gateway controller reports the amount of available unused generating capacity of the generation array to the grid authority. In this embodiment gateway controller monitors the unused generating capacity of the generation array. In one embodiment gateway controller instructs physical inverters to report their actual output powers ($P_i$) and their available powers $P_{i,AVA}$. Their available output power corresponds to the output power if their respective PV panels are operated at their respective maximum power points. The Gateway controller calculates the total of the differences between actual and available power for all inverters in the array and reports this quantity to grid authority. This quantity is commonly known as spinning reserve. In the event of an increase in power demand on electrical grid, grid authority may make a power request to the gateway and controller to supply additional power, up to the spinning reserve, to the grid. Gateway controller then determines and sends the power commands to inverters to increase their power output to meet the power request.

In the case of photovoltaic generation, the virtual inverter provided by the gateway controller and individual physical inverters can respond almost instantaneously, or at least quickly, to the request for power and rapidly adjust the PV panels to operate at their respective maximum power point which will beneficially improve grid stability. The power request might be for an increase of an amount of power in watts, a percentage increase in the current output power of the array or a total number of watts for the array to provide.

Power can be increased through a variety of methods analogous to previously described power reduction methods.

For example, if some inverters are idle and not injecting power into the grid then a number of inverters are selected by gateway controller to begin injecting power to meet the power request. Inverters can be selected using any of the degradation leveling scheme outlined previously. For example, in one embodiment inverters are selected based on hours of operation hours in which inverters with the fewest hours of operation are selected to begin injecting power. Inverters might also be selected based on weighted hours of operation or cumulative power in which inverters with the least amount of these quantities are selected to begin operation before inverters with greater amounts of these quantities.

In another embodiment, idle inverters are selected by gateway controller based on when they last injected power into the grid. The inverters with the earliest last injection times are selected to begin injecting power first. For example, if one idle inverter last injected power an hour ago and another idle inverter last injected power two hours ago then the inverter which last injected two hours ago will be selected to inject power. This embodiment may be useful if all inverters in the array were put into service at the same time.

In another embodiment, power is increased using the power leveling method described previously. For example, if the required total array power is $P_{ARRAY}$ then for an array of N inverters of equal capacity gateway controller attempts to adjust the output power of all inverters to a common value $P_{INV}$ given by the formula $$P_{INV} = P_{ARRAY}/N$$

In some situations, however, it may be that the calculated common value $P_{INV}$ exceeds the available power output of some inverters. These might be for example, inverters whose PV panels are experiencing shading, soiling, clouds, reduced solar conversion efficiency or orientations with reduced solar insolation. If there are M inverters whose power output is below $P_{INV}$ their output will be increased to their maximum values. The power of the remaining N-M inverters is increased to a common value $P_{INV}$ given by the equation $$P_{INV} = \frac{P_{ARRAY} - \sum_{i=1}^{M} P_i}{N - M}$$

where M is the number of inverters with output power below $P_{INV}$ and $\Sigma_{i=1}^{M} P_i$ represents the summation of their output power.

In another embodiment power is increased according to the temperature leveling method. The virtual inverter attempts to increase the power of individual inverters such that all inverters have substantially similar operating temperatures. The power of inverters with a low temperature is increased preferentially to inverters with a high temperature. The power output of the $i^{th}$ inverter might be increased by an amount $\Delta P_i$ in an iterative fashion according to the formula $$\Delta P_i = \frac{(2T_{AVE} - T_i)\Delta P_{ARRAY}}{NT_{AVE}}$$

where the required reduction in total array power is $\Delta P_{ARRAY}$, $T_{AVE}$ is the average inverter temperature, $T_i$ is the temperature of the ith inverter and the number of inverters in the array is N.

Similarly to the previously described temperature leveling methods for power reduction, power might also be increased in a series of increments in which the increments $\Delta P_i'$ are some fraction of the amounts calculated in the previous formula. For example, $\Delta P_i'$ might be:

$$\Delta P_i' = K*\Delta P_i$$

where K might be a constant or a fractional series summing to one.

Reactive Power

Another emerging requirement for distributed generators is the ability to supply reactive power to the grid. Under normal conditions the grid voltage and current are in-phase however in the presence of large reactive loads they can become undesirably out of phase. It is desirable for a distributed generator to be capable of adding amounts of reactive power to correct the grid power factor. For example, German standard VDE 4105 requires that distributed generators larger than 13.8 kVA be able to supply power with a power factor value (cos φ) ranging from 0.9 under excited to 0.9 over excited. The German standard BDEW "Generating Plants Connected to the Medium-Voltage Network" requires that it be possible to reach the target power factor value within ten seconds. The reactive power requirements of the grid can be set by specifying a fixed amount of reactive power in VARs (Volts Amps Reactive), a fixed power factor, or a characteristic curve.

An inverter is designed to handle the maximum output power of its PV panel and has a maximum design power $P_{MAX}$. During some periods of operation however, for example, on cloudy or overcast days, times of day when the sun is not directly overhead, or winter months when the sun is low in the sky, PV panels are not generating their maximum power. An inverter will therefore typically have spare power handling capacity, even during daylight hours. In the case of seasonal reductions in solar intensity this available capacity may be quite stable. Therefore, if the inverter is capable of supplying reactive power, it can be used to supply reactive power without compromising their supply of active power. During night time the PV panels do not generate any power and the entire power handling capacity of a PV array is available to supply reactive power.

In one embodiment inverters are capable of supplying reactive power. The gateway controller monitors their power output and directs those inverters with unused power capacity to supply reactive power to meet the grid authority's requirements.

In one embodiment, grid authority communicates a request for an amount of reactive power $Q_{TOT}$ in VARs to the gateway controller. The gateway controller determines the ability of the array to meet the request by requesting the inverters to report their output power. The gateway controller determines the available reactive power capacity of the array $Q_{CAP}$ using the formula $$Q_{CAP} = \sum_{1}^{N} \sqrt{P_{MAX}^2 - P_i^2}$$

Gateway controller can therefore determine what portion of its available capacity the requested reactive power represents and convey that information to the grid authority. If $Q_{TOT}$ meets or exceeds $Q_{CAP}$ then gateway controller 101 sends commands to the inverters such that they supply their maximum possible reactive power without reducing their existing real power out.

If the $i^{th}$ inverter is outputting real power of value $P_i$ and a corresponding current of value $I_i$ and has a maximum current carrying capacity of $I_{MAX}$ then the phase angle $\Phi_i$ to maximize the inverter's output of reactive power without compromising the supply of real power is given by the equation:

$$\cos \Phi_i = I_i / I_{MAX}$$

In one embodiment gateway controller calculates the phase angles for each inverter and instructs each inverter to alter its phase angle to $\Phi_i$ and its current to $I_{MAX}$. In another embodiment gateway controller instructs the inverter to supply its maximum reactive power and the inverter calculates the phase angle.

If the required reactive power is ($Q_{TOT}$), is less than the available array capacity then the gateway controller distributes the reactive power requirement among the physical inverters of the array. In general the phase angles $\Phi_i$ of the N physical inverters in the array are adjusted to meet the condition $$Q_{TOT} = \sum_{i}^{N} V_i I_i \sin \Phi_i$$

where $V_i$ and $I_i$ are the magnitude of the voltage and current being supplied by the i-th inverter. There are a variety of ways to distribute the reactive power requirement among the physical inverters of the array.

In one embodiment selected inverters in the array are adjusted to maximize their reactive power without compromising their supply of real power and sufficient to meet the reactive power requirement $Q_{TOT}$. The output of the remaining, unselected inverters does not change. In one embodiment, the inverters selected are those supplying the least amounts of real power. In another embodiment the inverters selected are those with the lowest operating temperatures. In another embodiment the inverters selected are those with the fewest number of hours of operation. In another embodiment selection is based on the total hours of operation of the inverter weighted by an acceleration factor that is dependent on the inverter operating temperature. In another embodiment the selected inverters are those which have cumulatively produced the least amount of power. In another embodiment, the reactive power requirement is distributed equally among all inverters in the array. In this embodiment the reactive power apportioned to the i-th inverter $Q_i$ in an array of N inverters is $$Q_i = Q_{TOT}/N$$

This embodiment may be useful for situations in which the array is delivering very little real power (such as night time) or in which a fast response to the grid request is required. Similar to the real power case mentioned earlier, a correction may be required if the requested reactive power $Q_i$ exceeds the ability of an individual inverter to provide it. In this case the inverter will supply its maximum reactive power and the remaining inverters supply a corrected amount of reactive power to compensate.

Reactive Power Leveling

In one embodiment the amount of reactive power $Q_i$ assigned to an inverter with a real power output of $P_i$ is chosen such that all the inverters operate at substantially the same complex power. In this embodiment the gateway controller will apportion reactive power such that all inverters have the same complex power $S_{INV}$ where $S_{INV}$ is given by the equation $$S_{INV}^2 = P_i^2 + Q_i^2$$

The value of $S_{INV}$ for a particular grid reactive power requirement $Q_{TOT}$ can be found by solving the equation $$Q_{TOT} = \sum_{1}^{N} \sqrt{S_{INV}^2 - P_i^2}$$

where $P_i$ is the real power of the i-th inverter and N is the number of inverters in the array. The above equation does not have a closed form solution but can be solved by numerical methods. Once the value of $S_{INV}$ is known individual values of $Q_i$ for each inverter can be calculated using the equation $$Q_i = \sqrt{S_{INV}^2 - P_i^2}$$

Reactive Power Optimization Method

Figure 16:
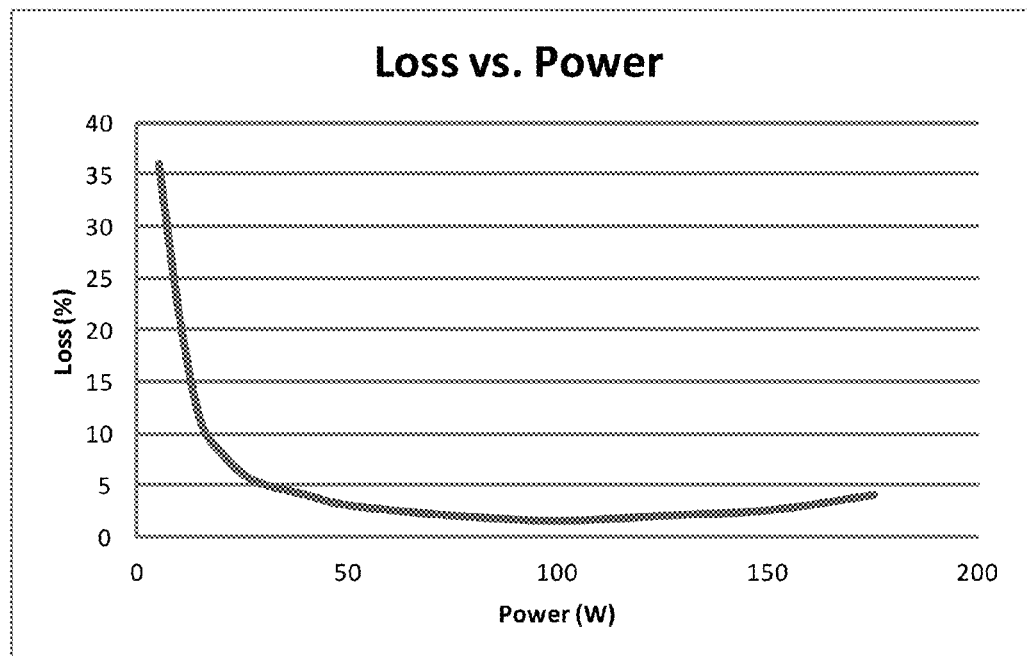
FIG. 16 depicts a plot of percentage loss versus output power for an illustrative inverter.

In another embodiment, reactive power is apportioned among all inverters to minimize losses associated with generating reactive power. The power loss of an inverter is not constant and normally depends on its output power. Loss is defined as the difference between the real input power and the real output power. Percentage loss is the ratio of loss to real input power. The percentage loss versus output power relationship of some inverters is a curve with the peak in efficiency usually occurring between ½ to ⅔ of maximum power. FIG. 16 is a plot of percentage loss versus output power for an illustrative inverter. The inverter has a maximum output power of 175 watts and the loss has a minimum at an input power of about 125 watts.

If the i-th inverter of a generation array is outputting only real power with a current of $I_i$ and the percentage loss is a minimum at a current of $I_{MIN}$ then the phase angle $\Phi_i$ to produce reactive power that will minimize the inverter's percentage loss without compromising the supply of real power is given by the equation:

$$\cos \Phi_i = I_i/I_{MIN}$$

provided $I_i \leq I_{MIN}$. Alternately, if $P_{MIN}$ is the power level corresponding to the inverter's minimum percentage loss and $P_i$ is the output power of the i-th inverter then the amount of reactive power $Q_i$ apportioned to the i-th inverter to put it at its point of peak efficiency is $$Q_i = \sqrt{P_{MIN}^2 - P_i^2}$$

provided $P_i < P_{MIN}$. It will be understood that when an inverter is supplying a combination of real power $P_i$ and reactive power $Q_i$ that its output power is actually complex power $S_i$. Loss curves are normally measured for the production of 100% real power. Loss curves for the production of complex power depend on the relative ratio of real to reactive power and are generally different from the loss curves for the production of 100% real power. Therefore the value of real power $P_{MIN}$ for the production of 100% real power may differ from the value of complex power corresponding to minimum percentage loss for the production of complex power. Typically however, all percentage loss curves are flat bottomed in the middle region of their power range and errors in the value of $P_{MIN}$ do not produce large errors in the minimum percentage loss value. In one embodiment then, the real power minimum percentage loss value is used in the above equation to calculate apportioning of reactive power. In another embodiment, minimum percentage loss values for different ratios of real to reactive power are used. In another embodiment, the minimum percentage loss power value for production of 100% reactive power is used for the control of night time reactive power production.

In this embodiment, reactive power is apportioned to a selected number of inverters such that the inverters produce power at their point of minimum percentage loss without compromising their supply of real power and the total of their reactive power meets the reactive power requirement. In one embodiment, inverters are selected based on their percentage power losses whereby inverters with the highest percentage power losses are selected before inverters with lower levels of percentage loss. This may correspond to those inverters operating with the least real output power. In this embodiment the remaining inverters are not apportioned any reactive power.

If there is insufficient capacity in the array to meet the reactive power requirement with all inverters operating at the minimum percentage loss point $P_{MIN}$ then the inverters are operated at a common value of complex power $S_{INV}$ where $S_{INV} > P_{MIN}$. The value of $S_{INV}$ can be calculated by the method described above.

Other reactive power supply scenarios are possible. In another embodiment grid authority requests a power factor rather than an amount of reactive power. In this embodiment gateway controller adjust the power factor of inverters to the requested value.

Islanding

The gateway controller can also respond to faults on the grid and coordinate the response of the inverters under its control. When the supply of power to the grid from the main grid generator is interrupted due to, for example, unforeseen equipment failure a distributed generator downstream from the main generator is required to disconnect itself from the grid to prevent the creation of dangerous "power islands". Power islands are areas of the grid that remain powered with a sustained voltage and frequency after a power outage and can be potentially fatal to power workers who unknowingly encounter them. Islanding detection methods can be passive or active. Passive techniques are inexpensive and easy to implement but have relatively large non-detection zones (i.e. conditions under which formation of an island is not detected). Active techniques on the other hand have a much smaller non-detection zone. German code VDE-AR-N 4105 requires active detection methods for distributed three phase generators with inverters.

Active techniques rely on the distributed generator attempting to introduce perturbations into the grid. If the main generator is connected to the grid and no island has formed then the distributed generator will be unable to significantly perturb the grid. If an island has formed however, the distributed generator will be able to produce measureable perturbations, indicating that an island has formed.

Active island detection techniques are well known and include Impedance Measurement (IM), Active Frequency Drift (AFD), Active Frequency Drift with Positive Feedback (AFDPF), Reactive Power Export with Error Detection (RPEED). All these techniques become less effective as the power of the inverter decreases. In PV Panel array 480, a single inverter may not have enough power to perturb the grid by a detectable amount when an island has formed. However, the combined inverters of the generation array may be able to perturb the grid enough to detect an island, if the inverters in the array can be coordinated to produce a single synchronized perturbation. A barrier to this approach is that individual inverters in array are unaware of each other and therefore cannot size their perturbations appropriately. Too small a perturbation will result in undetected islands while too large a perturbation may generate undesirable instabilities on the grid during normal operation. For instance, impedance measurement anti-islanding methods rely on the injection of a small current at a harmonic of the grid frequency to determine the grid impedance. Many inverters in parallel simultaneously injecting a harmonic current may increase the harmonic distortion to undesirable levels. Similarly, the Active Frequency Drift method depends on a current waveform incorporating a slight distortion such that there is a continuous trend to change the frequency. Again, too many inverters in parallel may result in unacceptable shifts in the grid frequency during normal operation.

In one embodiment gateway controller is in communication with inverters and is aware of the number of inverters (N) in array and their perturbation method. The gateway controller controls the size of individual perturbations from each inverter to produce an array perturbation of size sufficient to detect an island but not so large as to cause unwanted grid instabilities. In one embodiment all inverters produce a perturbation signal. For example, if the impedance measurement method is used and a perturbation current $I_{PERTURB}$ is required for reliable island detection then gateway controller directs each inverter to inject a current of $I_{PERTURB}/N$ at a harmonic to the grid frequency. All inverters in the array continuously measure $V_{PERTURB}$, the resultant voltage at the harmonic frequency. If $V_{PERTURB}$ is above a threshold it indicates formation of an island.

For a large array the value of $I_{PERTURB}/N$ may be too small to be reliably produced by an inverter's island detection circuitry.

Therefore, in another embodiment only a specific number of inverters (M) produce a perturbation signal of size $I_{PERTURB}/M$. The remaining inverters do not produce a perturbation signal. All inverters however, may measure the perturbation voltage and will cease power injection if an island is detected. In this embodiment, the gateway controller rotates the perturbation operation through all inverters on a time scale sufficient to meet grid code requirements for island detection. For example, if an island must be detected within two seconds of formation then the perturbation operation is controller such that all inverters produce a perturbation at least once every two seconds.

In another embodiment the virtual inverter synchronizes the island detection operation such that a perturbation is applied intermittently, reducing the distortion to the grid. In one embodiment gateway controller sends a command to the inverters to begin island detection for a specific duration after which they cease island detection. The island detection operation need only be applied with sufficient frequency to meet the Grid Code requirements of the particular grid it is connected to. For instance, IEEE 1547 Standard for Interconnecting Distributed Resources with Electric Power Systems requires that an island be detected within two seconds of its formation. German code VDE-AR-N 4105 requires detection and disconnection from an island within 5 seconds. Thus, depending on the speed of detection, a coordinated island detection operation might only be required to be applied with a frequency not much more than once every two seconds. This would advantageously reduce distortion on the grid and unnecessary power consumption.

In another embodiment, islanding detection is done by the grid. In this embodiment gateway controller is in communication with the grid authority. When the grid authority detects the formation of an island it transmits the fault information to the gateway controller. The gateway controller then determines whether to disconnect inverters from the grid. In this method grid authority has only to communicate with the gateway controller rather than all individual inverters in the generation array. In some embodiments the fault information consists of the location of the fault on the grid. The gateway controller then determines whether inverters are located within the islanded area of the grid and whether it should stop their power injection or disconnect them. In another embodiment the information is a list of specific segments of the grid that constitute the island and virtual inverter determines whether any of inverters are located on those segments. In another embodiment grid authority issues a list of distributed generators which should cease power injection or disconnect. Virtual inverter determines if it is one of the specified generators and if so stops power injection of its physical inverters or disconnects them.

Recovery after Islanding

After a distributed generator disconnects from the grid due to detection of an island there is normally a mandatory waiting period between the redetection of the grid by the distributed generator and reconnection of the distributed generator. The waiting period is normally specified by the grid code. For instance, in some grids a waiting period of five minutes is specified. In the prior art PV array this waiting period would normally be programmed into all inverters in the array. All inverters will therefore attempt to reconnect to the grid simultaneously after the end of an islanding event. Depending on the size of the array this might cause undesirable large transients in the grid and lead to further grid instability. Some grid codes require a gradual power up. For example, German grid code VDE 4105 requires a reconnection power gradient of no more than 10% of the nominal active power of the distributed generator per minute.

The virtual inverter can provide gradual power up of an array of inverters. In one embodiment virtual inverter controls the power injection or reconnection of physical inverters to ensure a gradual and orderly restoration of the array's power injection into the grid. In one embodiment gateway controller sequentially issues commands to inverters to either reconnect or begin power injection at a substantially constant rate which results in a power output increase which does not exceed the maximum specified by the grid code. For instance, if the grid code specifies a maximum output power increase of $P_{MAX}$ watts/minute and the nominal output power of an individual array inverter is $P_O$ watts then the gateway controller would issue commands to reconnect or begin power injection at a maximum rate of $P_{MAX}/P_O$ commands per minute.

Figure 17:
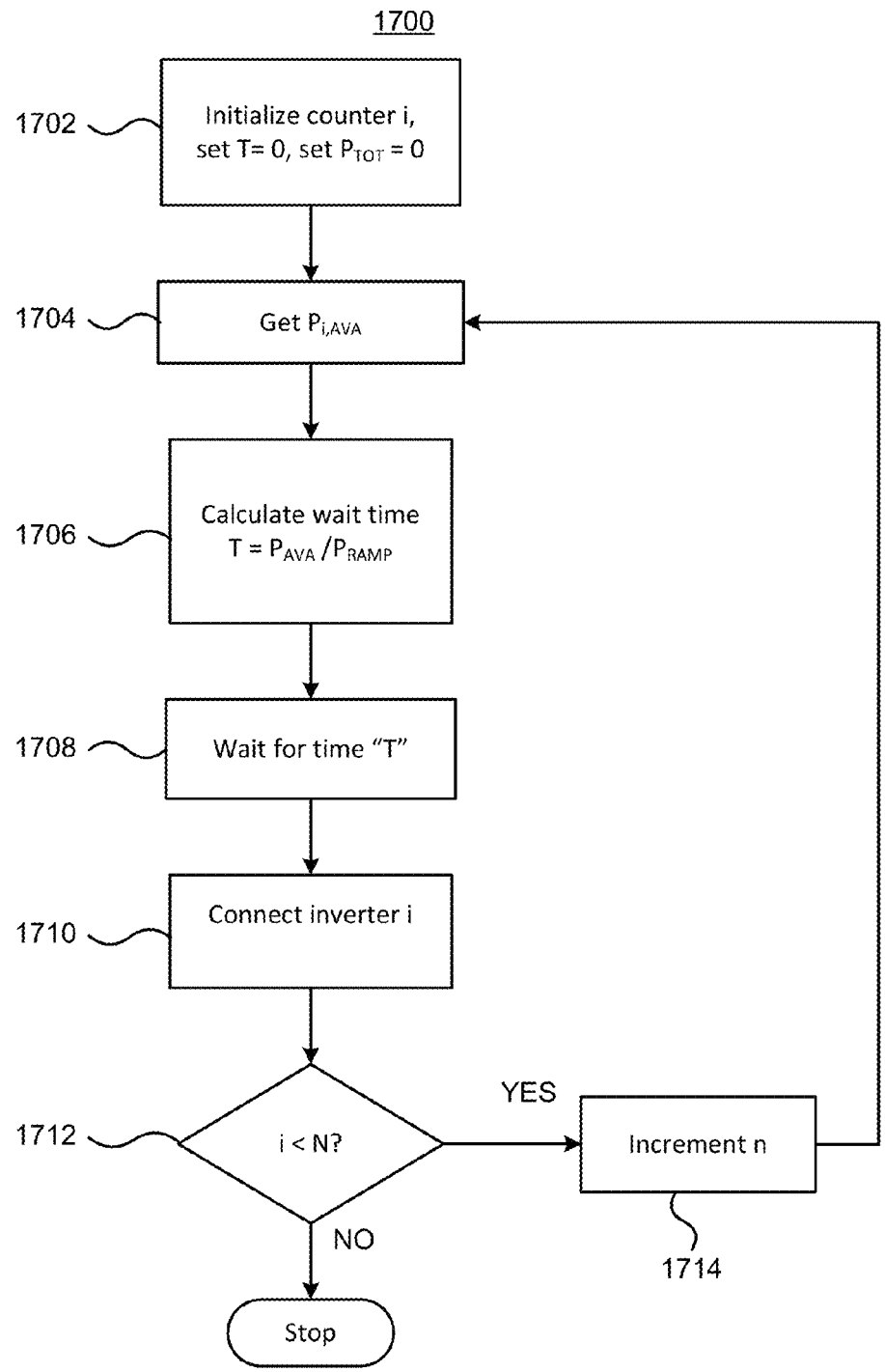
FIG. 17 depicts a method of power up for inverters.

FIG. 17 is flow chart of another illustrative power up method. In this embodiment the gateway controller sequentially issues commands to reconnect or begin power injection such that the rate of increase in the power output of the array to the grid does not exceed the maximum specified by the grid code. The inverter count "i" is initialized and T is set to 0 along with $P_{TOT}$ (1702). The gateway controller queries inverter i for its available power (1704) rather than relying on the inverter's nominal output power. An appropriate wait time "T" is determined based on the inverter's available power and the maximum power ramp value $P_{RAMP}$ (1706). After waiting for the wait period T (1708) the gateway controller instructs the inverter i to connect or begin injecting power to the grid (1710). The inverter count is evaluated (1712) for completion of the reconnection process. If the counter value is less than the number of inverters in the array (N) (Yes at 1712) then the count is incremented (1714) and the available power for the next inverter i is obtained (1704). If the count value is greater than or equal to N (No at 1712) the method stops (1716).

In another embodiment, instead of performing a wait operation, the gateway controller instructs the inverter to increase its injected power from zero to its full available power over the calculated period wait T.

The benefits of an orderly reconnection of inverters in a large array are not limited to islanding event but are advantageous any time the distributed generator must connect to the grid. This includes initial connection of the generator to the grid or reconnection after a grid fault such as over/under voltage or over/under frequency.

Dynamic Grid Support, Fault Ride Thorough and Fault Clearing

Another emerging requirement for distributed generation systems is the ability to contribute to grid stability during low voltage transient events. Low voltage transients are typically caused by a short circuit on the grid from a sudden equipment failure, downed transmission lines or the like. They are distinguished from ordinary low grid voltages due to excessive loading by a sudden collapse in the grid voltage to near zero. Until recently distributed generators would disconnect from the grid during a low voltage transient. For instance a distributed generator might disconnect when the grid frequency was less than 85% of nominal. As distributed generation comes to represent a significant fraction of generating capacity however, it is advantageous for distributed generators to remain connected and supplying power for a limited period of time to prevent a grid collapse. The supply of short current during a low voltage transient will typically cause a breaker in the grid close to the fault to trip, thereby isolating the fault in a process known as fault clearing. Continued connection of a generator to the grid during a fault is commonly termed Low Voltage Ride Through (LVRT) or Fault Ride Through (FRT). LVRT requirements are typically part of the grid code and normally include a minimum connect time. For example, in the event of a complete collapse of the grid voltage to zero, PV installations which are connected to the medium voltage grid are now required by the German BDEW grid code to stay connected for a minimum time of 150 mS. In the event of a grid voltage collapse to not less than 30% of the nominal voltage they are required to stay connected for a minimum time of 600 mS.

It would be difficult for inverters to themselves accommodate LVRT requirements since they are designed to work with a single panel and a low voltage AC bus and are unaware of the size of the array they belong to or its type of grid connection. However, the gateway controller can accommodate the LVRT and FRT requirements.

In one embodiment the grid voltage is continuously communicated to gateway controller from any of inverters. In another embodiment the grid voltage is communicated from grid monitoring device of a connection point. A sudden drop in grid voltage to below the fault ride though threshold voltage triggers the start of the fault ride through timer in gateway controller. Inverters remain connected and continue to inject current into the grid through the connection point. Gateway controller continues to monitor the grid voltage. If the low grid voltage does not recover and persists beyond the generator's mandatory connect time then gateway control instructs inverters disconnect.

Figure 18:
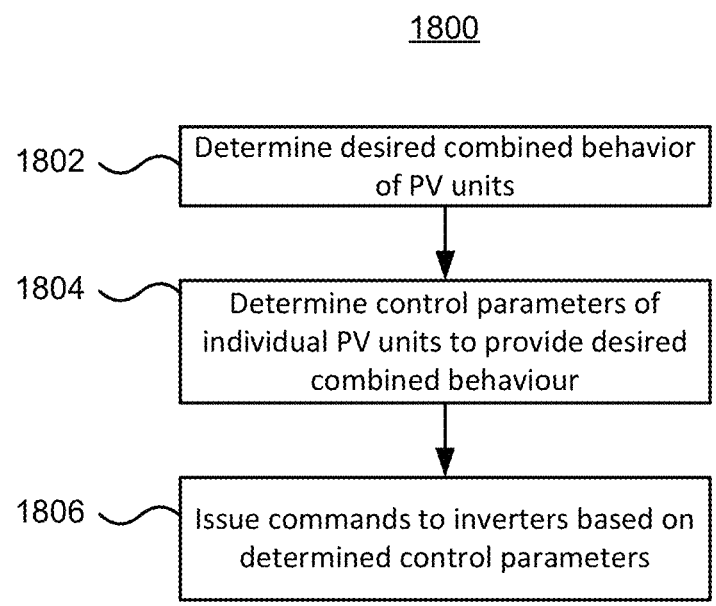
FIG. 18 depicts a method of controlling a plurality of photovoltaic units.

FIG. 18 depicts a method of controlling a plurality of photovoltaic units. The method 1800 may be performed by a gateway controller through the execution, by at least one processor, of instructions stored in a memory. The method 1800 determines a desired combined output behavior of the PV units. The desired combined behavior may be to provide a combined power output to the electrical grid, or may be to disconnect or connect to the grid, or adjust characteristics of the current injected into the grid. The determination of the desired combined behavior of the PV units may be done at the gateway controller by monitoring characteristics of the electrical grid and determining an appropriate behavior based on the monitored characteristics. For example, if the gateway controller determines that monitored characteristics of the electrical grid fall outside an acceptable or safe range, the desired combined behavior may be to disconnect all of the inverters from the grid. Further, the gateway controller may determine the desired combined behavior based on an indication of the desired combined behavior received from a grid authority. For example, the grid authority may indicate that the combined PV units should inject less power into the grid. The gateway controller may then determine that the desired combined behavior is to reduce power output. Once the desired combined behavior is determined, the method determines control parameters of individual PV units required to provide the desired combined behavior. The individual control parameters may be determined in various ways as described above. Once the control parameters of the inverters are determined, commands are issued to the inverters based on the determined control parameters. Depending upon the control parameters and their settings, the commands may be broadcast to all inverters in a broadcast message, or may be sent to individual inverters directly. The method 1800 allows a plurality of individual PV units to be controlled as a single generation unit.

As described above, a gateway controller may be used to control a plurality of individual inverters that supply power to a power grid in order to possibly improve the stability and/or safety of the power grid. Further the gateway controller may simplify the control or management of the plurality of inverters by providing a common point of control for a number of inverters. Further still the gateway controller may extend the operating lifetime of the inverters.

Although the description discloses example methods, systems and apparatus including, among other components, software executed on hardware, it should be noted that such methods and apparatus are merely illustrative and should not be considered as limiting. For example, it is contemplated that these hardware and software components could be embodied exclusively in hardware, exclusively in software, exclusively in firmware, or in any combination of hardware, software, and/or firmware. Further, although certain components or apparatuses are depicted as a single physical component, it is contemplated that they could be implemented as multiple separate components. Further still, it is contemplated that the functionality of multiple separate components described herein could be provided in a single component. Accordingly, while the following describes example systems, methods and apparatus, persons having ordinary skill in the art will readily appreciate that the examples provided are not the only way to implement such systems, methods and apparatus.

What is claimed is:

1. Photovoltaic (PV) power generation and control system comprising:
a coordinated power generation group comprising a plurality of generation units capable of outputting alternating current (AC), each generation unit comprising:
a PV panel capable of producing direct current (DC); and
an inverter capable of outputting AC from the DC produced by the PV panel, the inverter including a two way communication interface for receiving remote control information for setting at least one control parameter to control an output characteristic of the inverter and transmitting information indicative of an operating characteristic of the inverter; and
a gateway controller comprising:
a communication interface for communicating with the respective inverters of the plurality of generation units; and
control functionality for determining remote control information for selectively setting respective control parameters of the inverters based on a respective generation unit operating characteristic of the plurality of generation units received from the inverters to cooperatively control the output characteristics of the inverters of the plurality of power generation units to provide a desired coordinated behaviour from the plurality of power generation units.

2. The system of claim 1, wherein the coordinated power generation group is connected to an electrical grid and wherein the control functionality of the gateway controller comprises islanding functionality for the coordinated introduction of perturbations into the grid to cooperatively detect islanding of the coordinated power generation group.

3. The system of claim 1, wherein the control functionality further comprises islanding recovery functionality comprising the coordinated introduction of perturbations into the grid for detecting that the coordinated power generation group is no longer in a power island and for resuming power injection into the electrical grid.

4. The system of claim 1, wherein the control functionality of the gateway controller comprises output power control functionality for adjusting the output of respective inverters to provide a desired combined output from the coordinated power generation group.

5. The system of claim 4, wherein the output power control functionality determines the output of the respective inverters to extend an expected lifetime of at least one of the plurality of inverters.

6. The system of claim 4, wherein the output power control functionality determines the output of the respective inverters using two or more of:
   naïve power reduction;
   degradation leveling;
   hours of operation;
   cumulative power production;
   partial power reduction;
   power leveling;
   power maintenance;
   temperature leveling; and
   temperature maintenance.

7. The system of claim 1, wherein the control functionality of the gateway controller comprises grid stability and safety control functionality.

8. The system of claim 7, wherein the grid stability and safety control functionality comprises two or more of:
   over voltage/over frequency functionality;
   disconnect functionality;
   spinning reserve functionality;
   reactive power functionality;
   reactive power leveling functionality;
   reactive power optimization functionality; and
   fault ride through functionality.

9. The system of claim 1, wherein the inverter further comprises a temperature sensor for measuring a temperature of the inverter, and
   wherein the controller of the inverter further comprises functionality capable of monitoring the temperature measured by the temperature sensor and communicating the monitored temperature to the gateway controller.

10. The system of claim 1, wherein the inverter further comprises a voltmeter for measuring a voltage of the AC output from the inverter, and
    wherein the controller of the inverter further comprises functionality capable of monitoring the voltage of the AC output measured by the voltmeter and communicating the monitored voltage to the gateway controller.

11. The system of claim 10, wherein the inverter further comprises an ammeter for measuring a current of the AC output from the inverter, and
    wherein the controller of the inverter further comprises functionality capable of monitoring the current of the AC output measured by the ammeter and communicating the monitored current to the gateway controller.

12. A gateway controller for controlling a plurality of power generation units each outputting alternating current (AC) to an electrical distribution grid, the gateway controller comprising:
    a communication interface for communicating with the plurality of power generation units; and
    at least one processor and associated memory storing instructions for execution by the at least one processor, when executed by the processor, the instructions configuring the gateway controller to:
        determine a desired combined behaviour from the plurality of power generation units;
        determine control parameters of individual power generation units required to provide the desired combined behaviour; and
        issue commands, using the communication interface, to the individual power generation units to selectively control the determined control parameters of the individual power generation units based on a respective generation unit operating characteristic to provide the desired coordinated behaviour from the plurality of power generation units.

13. The gateway controller of claim 12, wherein the instructions, when executed by the processor, further configure the gateway controller to:
    control the output of the power generation units to cooperatively detect islanding of the plurality of power generation units.

14. The gateway controller of claim 12, wherein the instructions, when executed by the processor, further configure the gateway controller to:
    issue commands to the individual power generation units to cease injecting power into the electrical grid when islanding is detected.

15. The gateway controller of claim 14, wherein the instructions, when executed by the processor, further configure the gateway controller to:
    determine that the plurality of power generation units are no longer in a power island; and
    issue commands to the power generation units to resume power injection into the electrical distribution grid.

16. The gateway controller of claim 12, wherein the desired coordinated behavior is providing a desired combined output power to the electrical distribution grid, and the issued commands comprise commands for adjusting output of respective power generation units to provide the desired combined output from the plurality of power generation units.

17. The gateway controller of claim 16, wherein the output power of the respective power generation units are adjusted to extend an expected lifetime of at least one of the plurality of power generation units.

18. The gateway controller of claim 16, wherein the output of the individual power generation units required to provide the desired combined output is determined using one or more of:
    naïve power reduction;
    degradation leveling;
    hours of operation;
    cumulative power production;
    partial power reduction;
    power leveling;
    power maintenance;
    temperature leveling; and
    temperature maintenance.

19. The gateway controller of claim 12, wherein the desired combined behavior provides grid stability and safety control functionality.

20. The gateway controller of claim 19, wherein the grid stability and safety control functionality comprises one or more of:
    over voltage/over frequency functionality;
    disconnect functionality;
    spinning reserve functionality;
    reactive power functionality;

reactive power leveling functionality;
reactive power optimization functionality; and
fault ride through functionality.

21. A method controlling a plurality of power generation units, each outputting alternating current (AC) to an electrical distribution grid, the method comprising:
    determining at a gateway controller a desired combined behaviour from the plurality of power generation units;
    determining respective control parameters of respective power generation units required to provide the desired combined behaviour based on respective generation unit operating characteristics; and
    issuing commands, using a communication interface of the gateway controller, to the individual power generation units based on the determined control parameters of the individual inverters to provide the desired coordinated behaviour from the plurality of power generation units.

22. The system of claim 4, wherein the output power control functionality determines the output of the respective inverters using naïve power reduction.

23. The system of claim 4, wherein the output power control functionality determines the output of the respective inverters using degradation leveling.

24. The system of claim 4, wherein the output power control functionality determines the output of the respective inverters using hours of operation.

25. The system of claim 4, wherein the output power control functionality determines the output of the respective inverters using cumulative power production.

26. The system of claim 4, wherein the output power control functionality determines the output of the respective inverters using partial power reduction.

27. The system of claim 4, wherein the output power control functionality determines the output of the respective inverters using power leveling.

28. The system of claim 4, wherein the output power control functionality determines the output of the respective inverters using power maintenance.

29. The system of claim 4, wherein the output power control functionality determines the output of the respective inverters using temperature leveling.

30. The system of claim 4, wherein the output power control functionality determines the output of the respective inverters using temperature maintenance.

31. The system of claim 7, wherein the grid stability and safety control functionality comprises over voltage/over frequency functionality.

32. The system of claim 7, wherein the grid stability and safety control functionality comprises disconnect functionality.

33. The system of claim 7, wherein the grid stability and safety control functionality comprises spinning reserve functionality.

34. The system of claim 7, wherein the grid stability and safety control functionality comprises reactive power functionality.

35. The system of claim 7, wherein the grid stability and safety control functionality comprises reactive power leveling functionality.

36. The system of claim 7, wherein the grid stability and safety control functionality comprises reactive power optimization functionality.

37. The system of claim 7, wherein the grid stability and safety control functionality comprises fault ride through functionality.

* * * * *